US012568005B2

(12) United States Patent
Gilbert et al.

(10) Patent No.: US 12,568,005 B2
(45) Date of Patent: Mar. 3, 2026

(54) COMMUTATED RADIO SPATIAL ESTIMATION

(71) Applicant: DeepSig Inc., Arlington, VA (US)

(72) Inventors: Jacob Gilbert, Albuquerque, NM (US);
Kellen Harwell, Fayetteville, AR (US);
Daniel DePoy, Alexandria, VA (US);
Tim J. O'Shea, Arlington, VA (US)

(73) Assignee: DeepSig Inc., Arlington, VA (US)

( * ) Notice: Subject to any disclaimer, the term of this patent is extended or adjusted under 35 U.S.C. 154(b) by 32 days.

(21) Appl. No.: 18/646,031

(22) Filed: Apr. 25, 2024

(65) Prior Publication Data

US 2024/0364565 A1 Oct. 31, 2024

Related U.S. Application Data

(60) Provisional application No. 63/462,040, filed on Apr. 26, 2023.

(51) Int. Cl.
*H04L 25/03* (2006.01)
*H04L 25/02* (2006.01)

(52) U.S. Cl.
CPC .... *H04L 25/03891* (2013.01); *H04L 25/0254* (2013.01)

(58) Field of Classification Search
CPC ...................... H04L 25/03891; H04L 25/0254
USPC ........................................................ 375/262
See application file for complete search history.

(56) References Cited

U.S. PATENT DOCUMENTS

| | | | |
|---|---|---|---|
| 10,826,581 B1 | 11/2020 | Noorzad et al. | |
| 11,757,507 B2 * | 9/2023 | Raghavan | G01S 5/0236 |
| | | | 375/262 |
| 2020/0103523 A1 | 4/2020 | Liu et al. | |
| 2020/0142022 A1 | 5/2020 | Baxley et al. | |
| 2021/0211164 A1 | 7/2021 | O'Shea et al. | |
| 2022/0046386 A1 | 2/2022 | Sundararajan et al. | |
| 2024/0112009 A1 * | 4/2024 | Orekondy | H04B 17/391 |

OTHER PUBLICATIONS

PCT International Search Report in International Appln. No. PCT/US2024/026222, mailed on Aug. 1, 2024, 19 pages.

* cited by examiner

*Primary Examiner* — Dominic D Saltarelli
(74) *Attorney, Agent, or Firm* — Fish & Richardson P.C.

(57) ABSTRACT

A radio-frequency (RF) receiver includes: at least n antennas, where n is an integer greater than two; m processing channels configured to receive and process n RF signals from the at least n antennas, where m is an integer greater than one and less than n; a controller configured to cause a first processing channel of the m processing channels to receive, at different corresponding times, a plurality of RF signals of the n RF signals; an indexing module configured to receive outputs from the m processing channels, and generate one or more representations of the n RF signals based on the outputs; and a spatial estimation module configured to receive the one or more representations, execute a machine learning model based on the one or more representations, and determine, based on an output of the machine learning model, a spatial estimate for an emitter of the n RF signals.

30 Claims, 16 Drawing Sheets

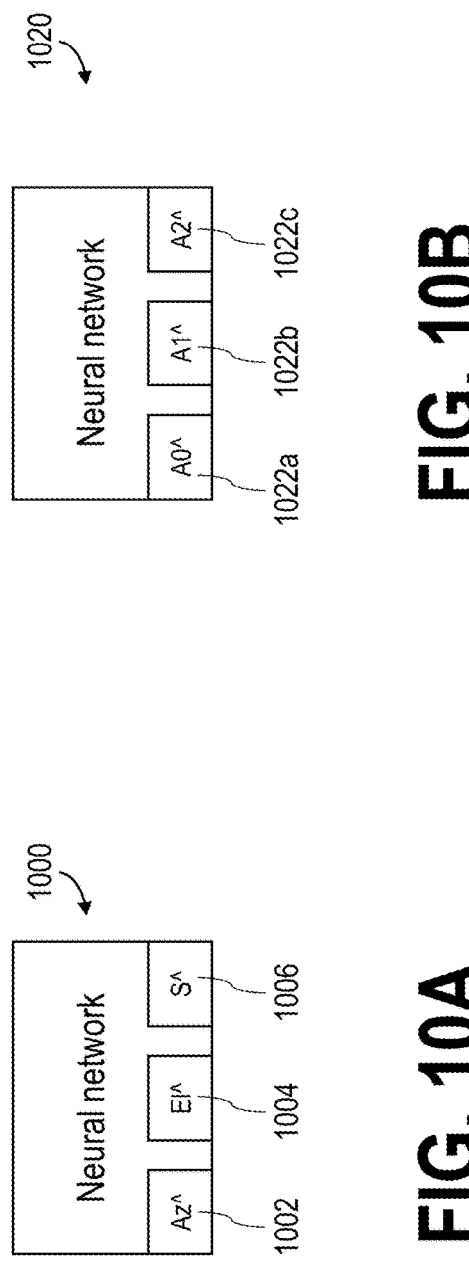
FIG. 10A
FIG. 10B
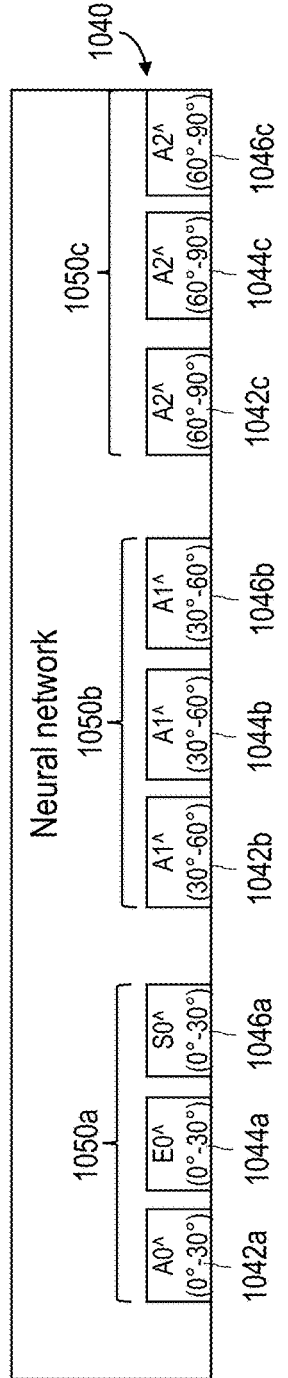
FIG. 10C

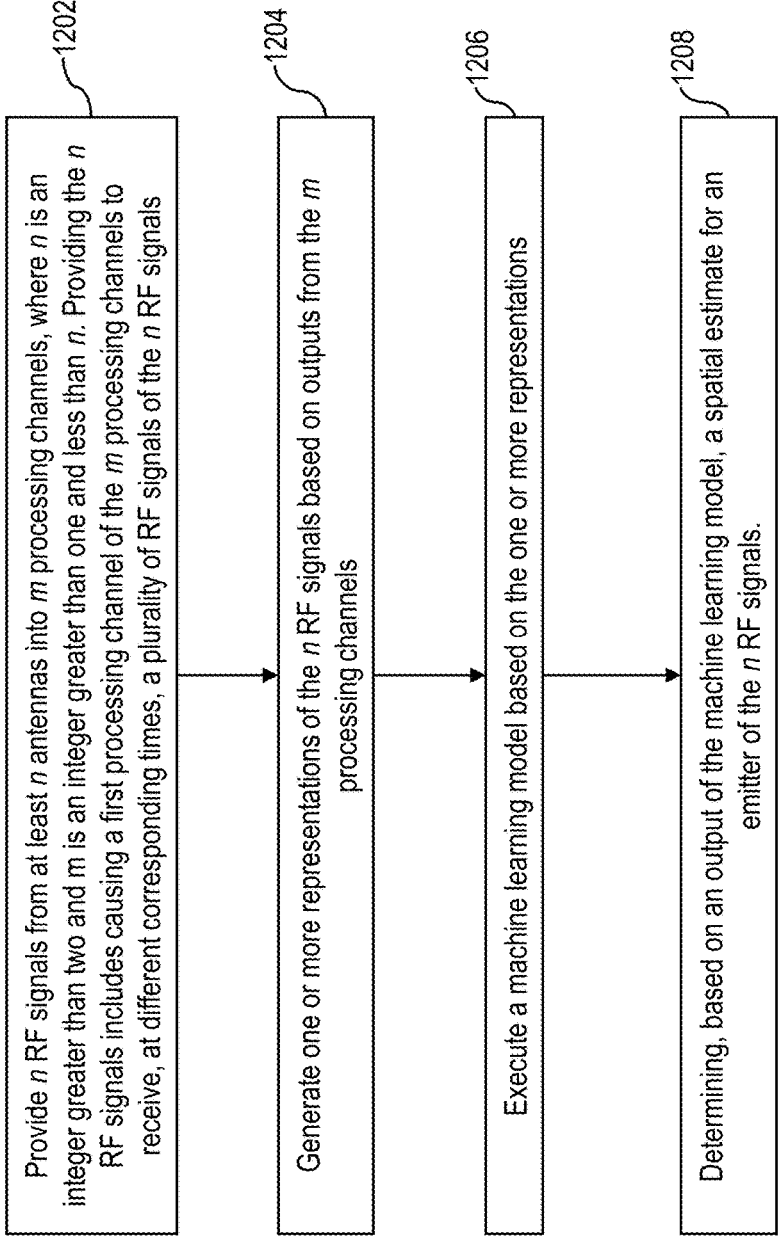

1200

Provide *n* RF signals from at least *n* antennas into *m* processing channels, where *n* is an integer greater than two and *m* is an integer greater than one and less than *n*. Providing the *n* RF signals includes causing a first processing channel of the *m* processing channels to receive, at different corresponding times, a plurality of RF signals of the *n* RF signals ⌇1202

Generate one or more representations of the *n* RF signals based on outputs from the *m* processing channels ⌇1204

Execute a machine learning model based on the one or more representations ⌇1206

Determining, based on an output of the machine learning model, a spatial estimate for an emitter of the *n* RF signals. ⌇1208

FIG. 12

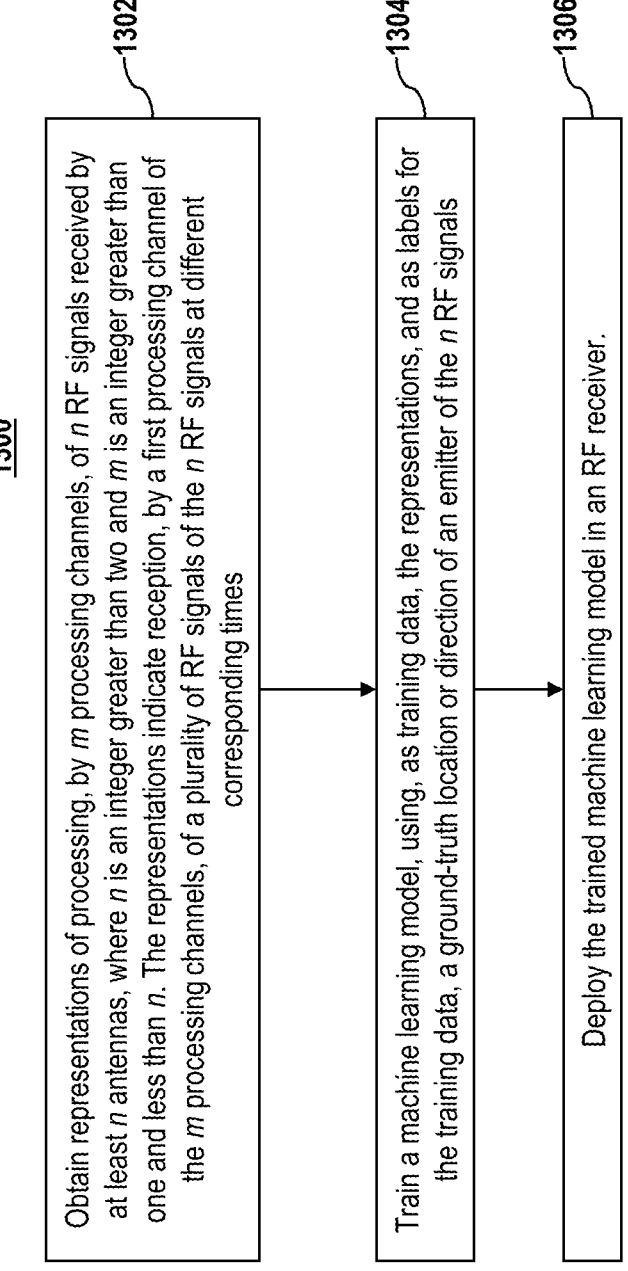

1300

Obtain representations of processing, by *m* processing channels, of *n* RF signals received by at least *n* antennas, where *n* is an integer greater than two and *m* is an integer greater than one and less than *n*. The representations indicate reception, by a first processing channel of the *m* processing channels, of a plurality of RF signals of the *n* RF signals at different corresponding times

1302

Train a machine learning model, using, as training data, the representations, and as labels for the training data, a ground-truth location or direction of an emitter of the *n* RF signals

1304

Deploy the trained machine learning model in an RF receiver.

COMMUTATED RADIO SPATIAL ESTIMATION

CROSS-REFERENCE TO RELATED APPLICATION

This application claims the benefit of the filing date of U.S. Provisional Patent Application No. 63/462,040, filed Apr. 26, 2023, the entirety of which is incorporated herein by reference.

TECHNICAL FIELD

The present disclosure generally relates to radio frequency (RF) communication systems.

BACKGROUND

Examples of radio frequency (RF) communication systems include radio access networks (RANs), cellular networks, small-cell networks, Wi-Fi access point-based networks, and other network types. RF emitter direction-finding can be performed based on received RF signals.

SUMMARY

Implementations of the present disclosure are generally directed to methods, systems, and devices associated with radio spatial estimation using commutated processing.

Some aspects of this disclosure relate to a radio-frequency (RF) receiver that includes: at least n antennas configured to receive at least n RF signals from an emitter, where n is an integer greater than two; m processing channels configured to receive and process the n RF signals from the at least n antennas, where m is an integer greater than one and less than n; a controller configured to cause a first processing channel of the m processing channels to receive, at different corresponding times, a plurality of RF signals of the n RF signals; an indexing module configured to: receive outputs from the m processing channels, and generate one or more representations of the n RF signals based on the outputs; and a spatial estimation module configured to: receive the one or more representations, execute a machine learning model based on the one or more representations, and determine, based on an output of the machine learning model, a spatial estimate for the emitter of the at least n RF signals.

This and other receivers, systems, platforms, and devices described herein can have one or more of at least the following characteristics.

In some implementations, the one or more representations include sparse representations of the plurality of RF signals received at the first processing channel at the different corresponding times.

In some implementations, the one or more representations include n representations corresponding to the n RF signals, the n representations including at least one sparse representation.

In some implementations, the m processing channels include a second processing channel configured to receive, from among the n RF signals, only another RF signal distinct from the plurality of RF signals.

In some implementations, the one or more representations include a non-sparse representation of the other RF signal.

In some implementations, the one or more representations include one or more time-domain tensors.

In some implementations, the indexing module is configured to receive, from the m processing channels, m corresponding outputs.

In some implementations, the spatial estimation module is configured to determine the location of the emitter unambiguously with respect to lines of bearing between the emitter and the at least n antennas and with respect to a line of symmetry between the at least n antennas.

In some implementations, the indexing module is configured to generate the one or more representations based on an association between the plurality of RF signals and the different corresponding times at which the plurality of RF signals are received at the first processing channel.

In some implementations, the indexing module is configured to obtain the association based on a timing signal.

In some implementations, the timing signal provides a common timing between the indexing module and the controller.

In some implementations, the indexing module is configured to commutate the plurality of RF signals in alignment with fixed radio frames based on the timing signal.

In some implementations, the outputs from the m processing channels include a fiducial feature, and the indexing module is configured to obtain the association based on the fiducial feature.

In some implementations, the fiducial feature corresponds to a reference signal received at the m processing channels, and the reference signal includes a null termination, an open circuit, a ground, or a predetermined code sequence.

In some implementations, the fiducial feature indicates a next-received RF signal of the plurality of RF signals.

In some implementations, the plurality of RF signals include a first RF signal from a first antenna of the at least n antennas, and a second RF signal from a second antenna of the at least n antennas, and the indexing module is configured to, based on the association: include data obtained from the first processing channel at a first set of times in a first representation of the one or more representations, the first representation corresponding to the first antenna, and include data obtained from the first processing channel at a second set of times, distinct from the first set of times, in a second representation of the one or more representations, the second representation corresponding to the second antenna.

In some implementations, the RF receiver includes at least one switch connected between the at least n antennas and the first processing channel, wherein the controller is configured to control the at least one switch to cause the first processing channel to receive, at the different corresponding times, the plurality of RF signals.

In some implementations, the spatial estimation module is configured to: determine a measure of relationships between multiple of the one or more representations; and execute the machine learning model based on the measure of relationships.

In some implementations, the measure of relationships comprises a covariance or a correlation.

In some implementations, the spatial estimation module is configured to: apply a domain transformation on the representations, to obtain transformed representations; and determine the measurement of relationships using the transformed representations.

In some implementations, each of at least two processing channels of the m processing channels includes at least one of a filter, an amplifier, a mixer, or an oscillator.

In some implementations, the controller is configured to cause each of the m processing channels to receive, at different corresponding times, at least two RF signals of the n RF signals.

In some implementations, the n antennas include a rectangular arrangement of four antennas.

In some implementations, the controller is configured to execute a second machine learning model to determine a commutation pattern for causing the first processing channel to receive the plurality of RF signals at the different corresponding times.

In some implementations, the controller is configured to: receive a spatial objective indicating a target task to be performed in determining the spatial estimate; and determine, based on the spatial objective, a commutation pattern for causing the first processing channel to receive the plurality of RF signals at the different corresponding times.

In some implementations, the spatial objective indicates a location of the emitter, a characteristic of RF transmission by the emitter, or an environmental condition.

In some implementations, the spatial estimate includes a location of the emitter, an azimuth angle of the emitter, or an elevation of the emitter.

In some implementations, the machine learning model includes a neural network including a plurality of heads, and each head of the plurality of heads is configured to output a respective estimate of a plurality of estimates, the plurality of estimates including the spatial estimate for the emitter.

In some implementations, the plurality of heads include at least two heads configured to output estimates for respective different RF emitters.

In some implementations, the plurality of heads include at least two heads configured to output estimates for respective different spatial regions.

In some implementations, the plurality of heads include: a first head configured to output the spatial estimate, and a second head configured to output a signalness of a frequency range.

Some aspects of this disclosure relate to a method. The method includes: providing n RF signals from at least n antennas into m processing channels, where n is an integer greater than two and m is an integer greater than one and less than n. Providing the n RF signals includes causing a first processing channel of the m processing channels to receive, at different corresponding times, a plurality of RF signals of the n RF signals. The method includes: generating one or more representations of the n RF signals based on outputs from the m processing channels; executing a machine learning model based on the one or more representations; and determining, based on an output of the machine learning model, a spatial estimate for an emitter of the n RF signals.

This and other methods described herein can have at least the characteristics described with respect to the operations of the foregoing RF receiver, and characteristics as described throughout this disclosure. For example, this and other methods described herein can have one or more of at least the following characteristics.

In some implementations, the one or more representations include sparse representations of the plurality of RF signals received at the first processing channel at the different corresponding times.

In some implementations, the one or more representations include one or more time-domain tensors.

In some implementations, the method includes generating the one or more representations based on an association between the plurality of RF signals and the different corresponding times at which the plurality of RF signals are received at the first processing channel.

In some implementations, the method includes obtaining the association based on a timing signal.

In some implementations, the outputs from the m processing channels include a fiducial feature, and the method includes obtaining the association based on the fiducial feature.

In some implementations, the fiducial feature corresponds to a reference signal received at the m processing channels, and the reference signal includes a null termination, an open circuit, a ground, or a predetermined code sequence.

In some implementations, the method includes determining a next-received RF signal of the plurality of RF signals based on the fiducial feature.

In some implementations, at least one switch is connected between the at least n antennas and the first processing channel, and the method includes controlling the at least one switch to cause the first processing channel to receive, at the different corresponding times, the plurality of RF signals.

In some implementations, the method includes executing a second machine learning model to determine a commutation pattern for causing the first processing channel to receive the plurality of RF signals at the different corresponding times Some aspects of this disclosure describe another method. The other method includes: obtaining representations of processing, by m processing channels, of n RF signals received by at least n antennas, where n is an integer greater than two and m is an integer greater than one and less than n. The representations indicate reception, by a first processing channel of the m processing channels, of a plurality of RF signals of the n RF signals at different corresponding times. The method includes training a machine learning model, using: as training data, the representations or a derivative thereof, and as labels for the training data, a ground-truth location or direction of an emitter of the n RF signals. The method includes deploying the trained machine learning model in an RF receiver.

In some implementations, the method includes generating the representations by simulating RF reception at the at least n antennas, the simulation including channel effects.

The foregoing and other receivers, systems, methods, and operations can be performed by and/or embodied using at least computing devices, computer systems, and/or non-transitory computer-readable media. A computer system or computing device can include one or more processors, and one or more non-transitory, computer-readable storage media storing instructions that, when executed by the one or more processors, cause the one or more processors to perform operations including the foregoing and other methods described herein.

The details of one or more implementations of the subject matter of this disclosure are set forth in the accompanying drawings and the description below. Other features, aspects, and advantages of the subject matter will become apparent from the description, the drawings, and the claims.

BRIEF DESCRIPTION OF THE DRAWINGS

FIGS. 10A-10C are diagrams illustrating examples of neural networks.

FIG. 12 is a diagram illustrating an example of a spatial estimation process.

FIG. 13 is a diagram illustrating an example of a machine learning model training process.

DETAILED DESCRIPTION

Figure 1:
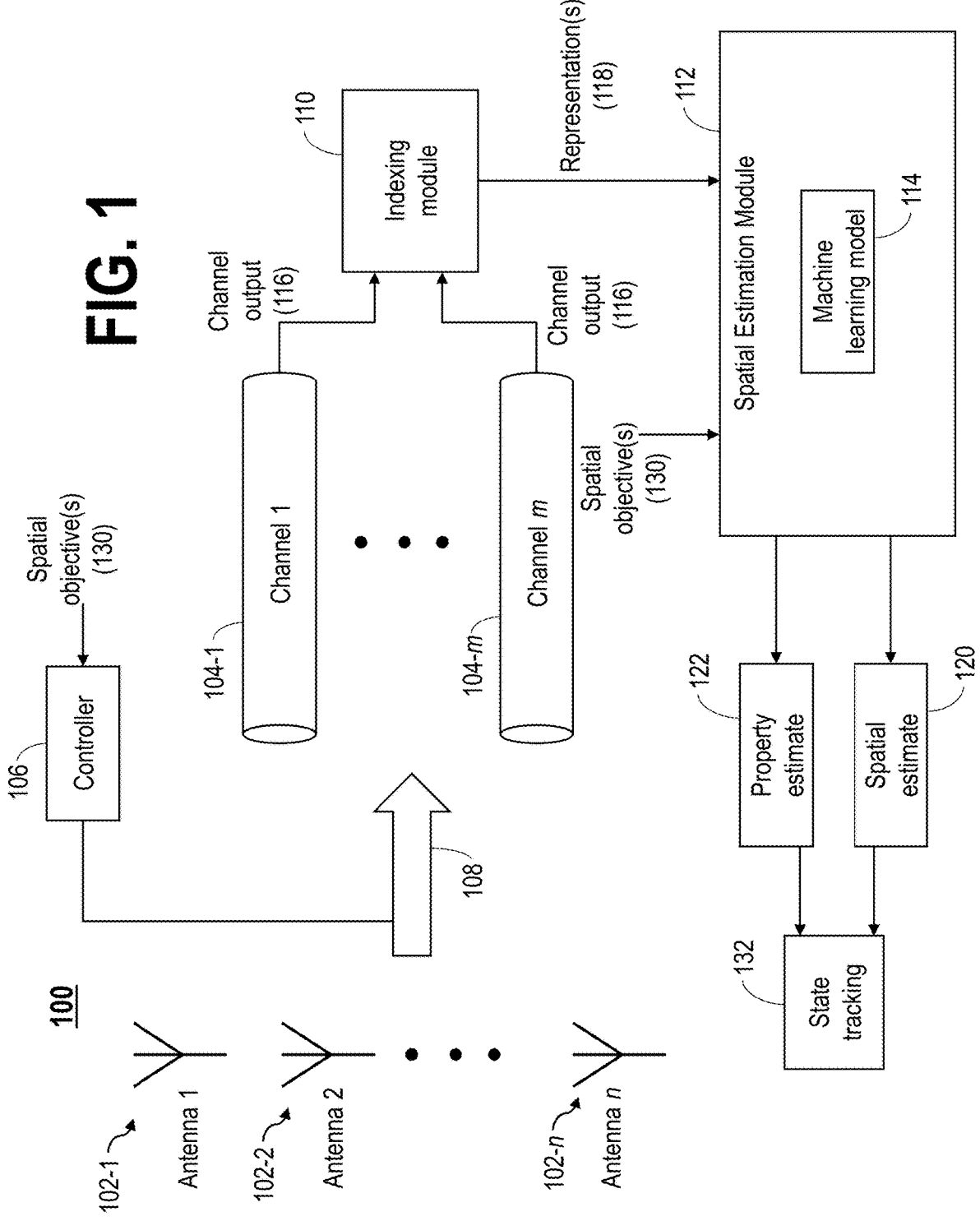
FIG. 1 is a diagram illustrating an example of a radio frequency (RF) system.

Various aspects of this disclosure describe radio systems (e.g., RF receivers) and associated methods for spatial estimation using commutated RF signal detection. RF signals from a set of antenna elements can be provided to a smaller number of RF processing channels in a commutated manner, in which at least one of the processing channels receives and processes, at different corresponding times, multiple RF signals from multiple antenna elements. A machine learning model is used to process the resulting representations of the RF signals (e.g., sparse representations), inferring the values of undetected signal portions to provide a spatial estimate indicating a position of an emitter of the RF signals. An emitter in this context refers to an electronic device with wireless communication capabilities, e.g., capable of transmitting wireless RF signals. For example, an emitter can be device with a cellular radio, a broadcast radio, a Wi-Fi radio, or a Bluetooth radio, among others, or a combination of these.

Spatial estimation in wireless systems is an enabler for functions such as multiple input multiple output (MIMO) and Massive MIMO systems, which utilize spatial diversity and spatial multiplexing; direction finding and localization of RF signal emitters; and radar and passive radar applications that estimate returns or angles of arrival or departure or orientation of antenna arrays.

Spatial estimation methods may rely on scaling the number of processing channels (e.g., digital receiver chains) directly with the number of antennas elements (e.g., digital combining/estimation techniques that assume standard uniform continuous digital sampling of each antenna element, or in some cases in which subarrays of multiple elements and analog phase shifters are used to feed a single digital channel or port). As a result, in many cases, systems to implement these methods are costly, large, and have high power requirements for operation and deployment. For example, many-channel radios with phase- and time-synchronization, additional RF hardware (e.g., amplifiers, filters, or mixers, among others), or a combination of these, for each channel may be needed.

However, low-channel count radios and radio frequency (RF) receivers (e.g., two-channel receivers) are widely available, and have significantly lower cost, power requirements and complexity compared to receivers with more channels. Moreover, these low-channel count receivers often reside largely within a single integrated RF integrated circuit (RFIC) component or single system on chip (SoC), making them convenient and cost-effective for integration with other platform systems, and viable for high volume and low-cost applications such as Internet of Things (IoT).

Some implementations of the systems and methods described herein can provide direction-finding with relatively few processing channels, reducing system cost, complexity, weight, power consumption, cooling requirements, and/or size compared to systems that rely on more processing channels. Moreover, some implementations of the systems and methods described herein can provide generalized direction-finding that can effectively process arbitrary or near-arbitrary RF signals without relying on assumptions about the RF signals.

FIG. 1 illustrates an example of an RF system 100 according to some implementations of this disclosure. The RF system 100 can be included in an RF receiver, e.g., a dedicated receiver or a transceiver. The RF system 100 can be included in various different types of devices and systems, such as network infrastructure (e.g., cellular base stations), vehicles, and user equipment (UE) (e.g., mobile devices such as smartphones). Examples of deployments of the RF system 100 are discussed below with respect to FIG. 11.

The RF system 100 includes n antennas 102 (102-1, 102-2, . . . , 102-n). The antennas 102 are configured to receive wirelessly-transmitted RF signals. The antennas 102 can include any suitable type of antenna, such as dipole antenna, patch antenna, monopole antenna (e.g., quarter-wave monopole), loop antenna, and/or array antenna. The antennas 102 can be directional and/or omnidirectional, and can be identical to one and/or another or different from one another. In some implementations, one or more of the antennas 102 is an array antenna including multiple antenna elements. In addition, or alternatively, two or more of the antennas 102 (e.g., all of the antennas 102) can be antenna elements of an array antenna that includes the two or more of the antennas 102.

The antennas 102 are configured and arranged to independently receive wireless RF signals. For example, an RF transmission can be received at some or all of the antennas 102 as respective RF signals, the RF signals having different characteristics corresponding to different channels between an emitter of the RF transmission (and, correspondingly, the RF signals received at the antennas 102 and provided to channels 104, discussed below) and each antenna 102. For example, the RF signals can be received at different times (e.g., corresponding to different propagation distances) and/or with different signal strengths (gains) (e.g., corresponding to different directivities of the antennas 102 and/or corresponding to different attenuation for transmission to the antennas 102). These slight differences in signal reception can be used for emitter spatial estimation, e.g., direction-finding.

The RF system 100 further includes m processing channels 104 (104-1, . . . , 104-m) and a controller 106. The controller 106 (sometimes referred to as a selection scheduler) is configured to control coupling(s) between the antennas 102 and the processing channels 104, to cause wholly or partially commutated transfer of RF signals 108 from the antennas 102 to the processing channels 104. For example, the controller 106 can be configured to control a switch network (e.g., switch 208 or switch networks 408, 508, 508a, 508b), or otherwise adjust couplings, to control which processing channels 104 receive signals from which antennas 102 at each time (e.g., at each clock cycle or set of clock cycles, radio frame, etc.). For example, as discussed below, the controller 106 can be configured to cause a first processing channel 104 receive, at different corresponding times, a plurality of RF signals from a plurality of antennas 102. This process can be referred to as commutated RF signal reception.

The controller 106 can include analog and/or digital circuitry, and/or a programming module (e.g., a program, software application, etc.), configured to control the couplings. For example, the controller 106 can include hardwired, dedicated circuitry and/or programmable circuitry, such as a field programmable gate array (FPGA), application specific integrated circuit (ASIC), and/or general-purpose computer device (e.g., microprocessor(s) and memory), which can be configured by appropriate software and/or firmware to control RF signal transfer between the antennas 102 and the processing channels 104, as discussed herein.

The processing channels 104 each include circuitry implementing an RF processing chain (e.g., a digital receiver chain). For example, the processing channels 104 can each be configured to receive, as input from the antennas 102, an analog RF signal, and to perform suitable processing on the analog RF signals to obtain data represented by (e.g., embedded/encoded in) the analog RF signal. For example, the processing channels 104 can be configured to process the RF signals 108 to obtain raw or filtered in-phase (I) and quadrature (Q) data (IQ data), such as time series sampled radio data.

Figure 8:
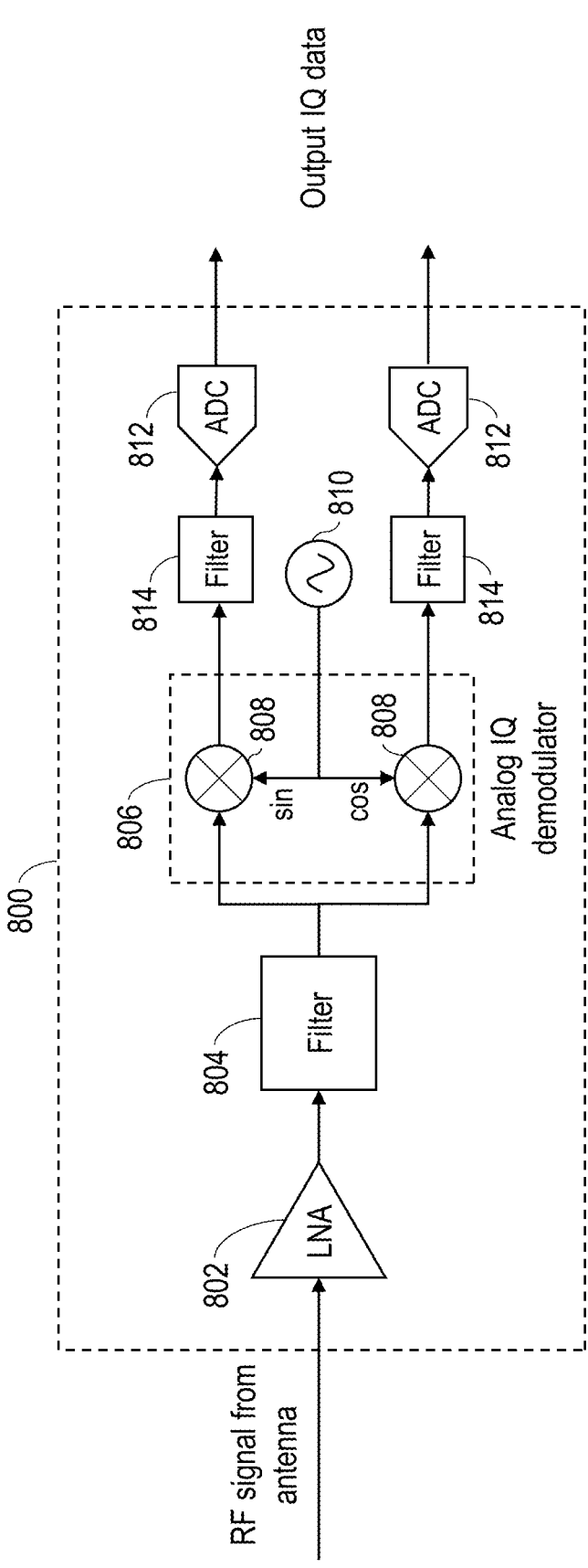
FIG. 8 is a diagram illustrating an example of a processing channel.

FIG. 8 illustrates an example of an RF processing channel 800 according to some implementations of the present disclosure. For example, one or more individual ones of the processing channels 104, 204, 404, 504, 908 of FIGS. 1, 2A-2C, 4, 5, and 9 can be the processing channel 800. For example, at least two processing channels of the processing channels 104, or each processing channel 104, can each include a filter, an amplifier, a mixer, and an oscillator, e.g., as described with respect to FIG. 8 or having another suitable configuration. In some implementations, at least two processing channels of the processing channels 104, or each processing channel 104, can each include an amplifier, a mixer, and an oscillator. In some implementations, at least two processing channels of the processing channels 104, or each processing channel 104, can each include one or more of, or two or more of, a filter, an amplifier, a mixer, or an oscillator (e.g., a mixer, or a filter and a mixer, or an amplifier and an oscillator, etc.). In this example, the processing channel 800 has a zero-IF architecture configured to output IQ data. However, other channel architectures are also within the scope of this disclosure, e.g., superheterodyne receiving and direct RF sampling, and it will be understood that the processing channels 104 can be any one or more of those and/or other types. Moreover, it will be understood that processing channels within the scope of this disclosure are not limited to the types, numbers, and arrangement of elements shown in FIG. 8 but, rather, can include other suitable types, numbers, and arrangements of elements, for example, drivers, mixers, filters, amplifiers, and balun, to provide several non-exhaustive examples. Moreover, in some implementations, the processing channels 104 can include one or more machine learning models, e.g., neural receiver models, that have been trained to perform some or all of the functions traditionally performed by dedicated processing modules of RF processing chains.

The processing channel 800 includes circuitry such as a low-noise amplifier (LNA) 802, a filter (e.g., a band-pass filter) 804, an analog IQ demodulator 806 including two mixers 808, a local oscillator (LO) 810, two baseband filters 814, and two analog-to-digital converters (ADC) 812). As will be understood, the LNA 802 amplifies a received RF signal (e.g., received from an antenna 102 through a switch network controlled by the controller 106). The filter 804 suppresses signals at frequencies outside a band of interest. The mixers 808 receive 90-degree out-of-phase signals from the LO 810, to convert the RF signal to a complex analog baseband signal. Baseband filters 814 perform further out-of-band filtering, and the ADCs 812 (e.g., a dual-channel ADC) sample the baseband signal to provide an output digital IQ signal (e.g., the channel output from the channels 104).

The processing channels 104 can be controlled and/or configured to receive RF signals from the antennas 102 (e.g., in parallel) and to process the RF signals in parallel (e.g., at least partially simultaneously). For example, the processing channels 104 can be configured to operate at a high speed to process the RF signals in real time and in parallel.

RF processing channels may represent a significant portion of the cost, weight, power consumption, and/or heat dissipation of RF devices. These considerations have become even more urgent in the contemporary context of widely-used RF receivers in smartphones, wearable devices, drones, base stations (e.g., massive MIMO base stations), other communications systems, etc. Accordingly, for purposes of this disclosure, it has been recognized that it may be beneficial to reduce the number of RF processing channels included in a device (e.g., an RF receiver) and used in a detection and spatial estimation process.

For example, some systems and devices according to this disclosure include, or utilize for detection and spatial estimation, fewer processing channels than antennas. For example, in the system 100 of FIG. 1, the number of processing channels 104, m, can be less than the number of antennas 102, n. In cases in which there are more antennas 102 than RF signals 108 output from the antennas, the number of output RF signals 108 can be n, the number of antennas 102 can be at least n, and the number of processing channels 104, m, can be less than the number of RF signals 108, n.

In some implementations, the system 100 (e.g., an RF receiver) includes only the m channels configured to receive and process signals from the n (or at least n) antennas. In some implementations, there may exist processing channels which are not utilized for the spatial estimation processes discussed herein. For example, a receiver may include three antennas and three processing channels, and spatial estimation can be performed using the three antennas and two of the three processing channels (e.g., in a configuration as described in reference to FIGS. 2A-2C); the third processing channel can optionally be used for other processes. In some implementations, the number of utilized channels (and, correspondingly, the commutation pattern) can be dynamically adjusted, e.g., based on precision requirements for spatial estimation, where a higher number of processing channels may provide improved spatial estimation, or specific elements may be sampled more because of their properties or orientations. Because the use of processing channels can be associated with higher power consumption and/or high cooling requirements, the use of fewer than all of the processing channels in a given system can be advantageous in cases when the smaller number of processing channels can provide target results. The subsequent discussion refers to the utilized processing channels; it will be understood that un-utilized processing channels may additionally be present.

In addition, for compatibility with commutated estimation and to avoid ambiguity in spatial estimation, n can be at least three, and m can be at least two. In contrast to typical systems that include the same number of processing channels and antennas in a 1-to-1 relationship, commutated methods, systems, and devices according to some implementations of this disclosure can include and/or utilize fewer processing channels than antennas by having at least one of the processing channels receive RF signals from multiple antennas at different times. This commutated detection, in combination with machine learning processing, has been found to be effective for spatial estimation.

Figure 3B:
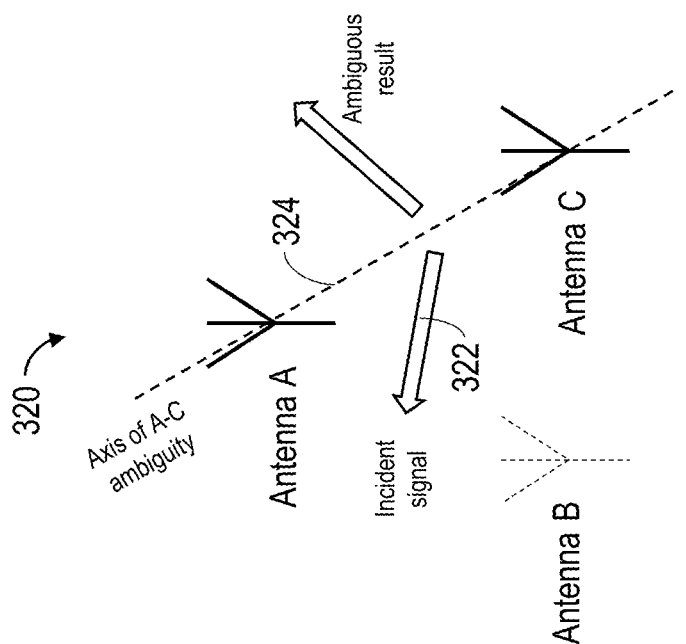
FIGS. 3A-3B are diagram illustrating localization.
Figure 3A:
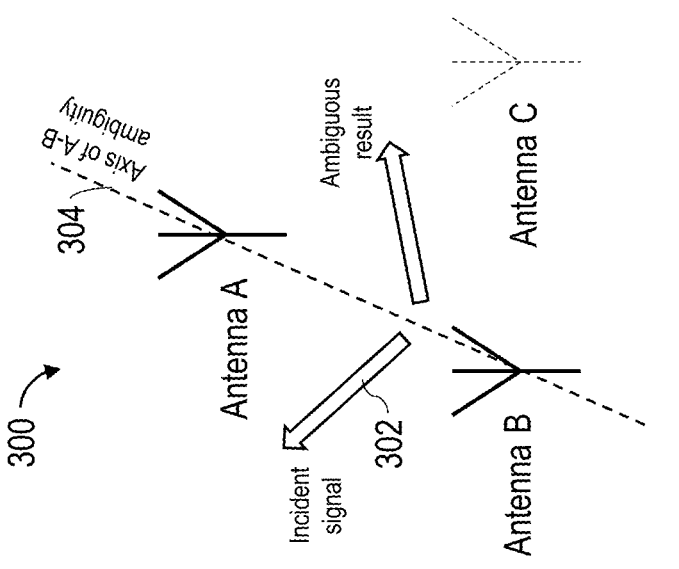

The use of at least three antennas can reduce or eliminate the inherent, symmetry-based ambiguity present in some localization configurations, e.g., in some two-antenna localization configurations or similar arrays such as a uniform linear array, whose spacing may be arranged to be limited along one plane or line. For example, FIGS. 3A-3B illustrate examples of two-antenna-element arrays 300 and 320, respectively. Array 300 includes Antenna A and Antenna B, and array 320 includes Antenna A and Antenna C; Antenna C and Antenna B are lacking from arrays 300 and 320, respectively. Localization performed using array 300 (e.g., time-difference-of-arrival localization using an incident signal 302) may be ambiguous with respect to an axis of A-B ambiguity 304 that extends between Antenna A and Antenna B, e.g., the localization process may be unable to distinguish between emitters in mirror-image positions on either side of the axis of A-B ambiguity. Similar, localization using array 320 based on an incident signal 322 may be ambiguous with respect to an axis of A-C ambiguity 324. For this reason, two-channel RF direction-finding can be ambiguous (e.g., when tying each channel to a single corresponding antenna element), because there may be multiple possible solutions for the line of bearing to a given emitter, or lines of symmetry between the two antenna elements. This ambiguity can result in erroneous or non-optimal operations in applications in which precise and reliable location-tracking is desired.

However, commutation between Antenna B and Antenna C, as described herein, can resolve the ambiguity. The commutation can represent an effective joining of the two arrays 300, 320, resolving the ambiguity, e.g., if received RF signals persist to a degree across both samples in a way that combining can jointly leverage them. The systems and methods discussed herein have characteristics that provide this joint leverage to provide unambiguous spatial estimation. For example, the systems and methods described herein can provide spatial estimation that is unambiguous with respect to lines of bearing to the emitter and lines of symmetry between antenna elements.

Figure 2A:
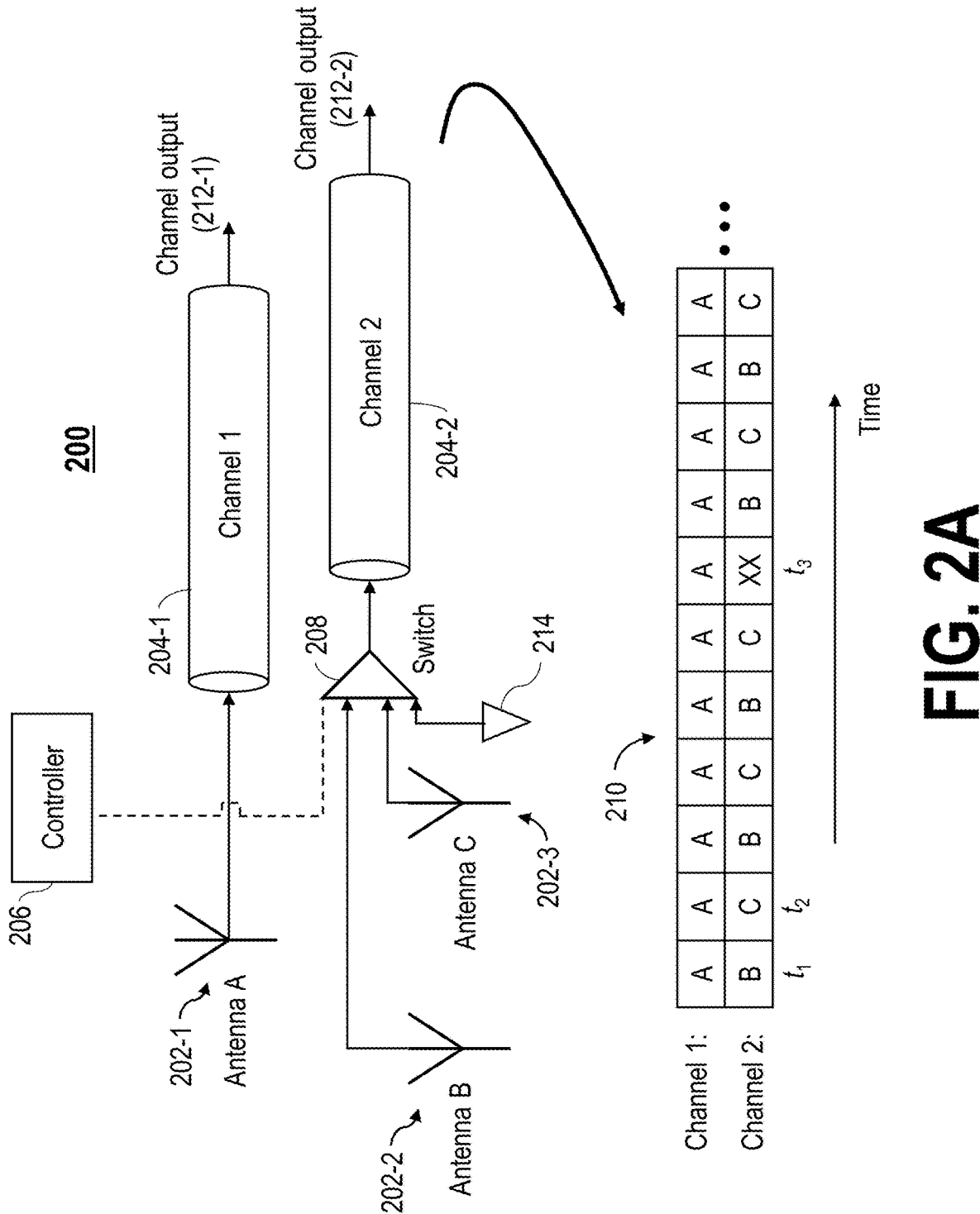
FIGS. 2A-2C are diagrams illustrating examples of RF systems.

FIG. 2A illustrates an example of a system 200 including a set of three antennas 202 (202-1 (Antenna A), 202-2 (Antenna B), 202-3 (Antenna C)), two processing channels 204 (204-1 (Channel 1), 204-2 (Channel 2)), and a controller 206 coupled to and configured to control a switch 208. The system 200 is an example of a portion of the system 100, e.g., where the antennas 202 are examples of the antennas 102 and the processing channels 204 are examples of the processing channels 104. Description applied to elements of the system 100 can be equally applied to corresponding elements of the system 200, and vice-versa, except where noted or made clear from context otherwise.

The antennas 202 can be arranged in various patterns in various implementations. In some implementations, the antennas 202 are arranged in a triangular pattern (e.g., a right triangular pattern), e.g., are not arranged collinear with one another, resolving the inherent ambiguity of two-aperture direction-finding.

In this example, the controller 206 is configured to cause Channel 2 to receive, at different corresponding times, RF signals from Antenna B and Antenna C. For example, the switch 208 can be coupled to Antennas B and C to receive RF signals from each of Antennas B and C, and the switch 208 can be togglable between outputting the RF signal from Antenna B and outputting the RF signal from Antenna C. The controller 206 can toggle the switch 208 according to a predetermined timing pattern to cause Channel 2 to receive RF signals from Antenna B or Antenna C at alternating times. Accordingly, system 200 is configured for commutated detection with respect to Antennas B and C.

Figure 5:
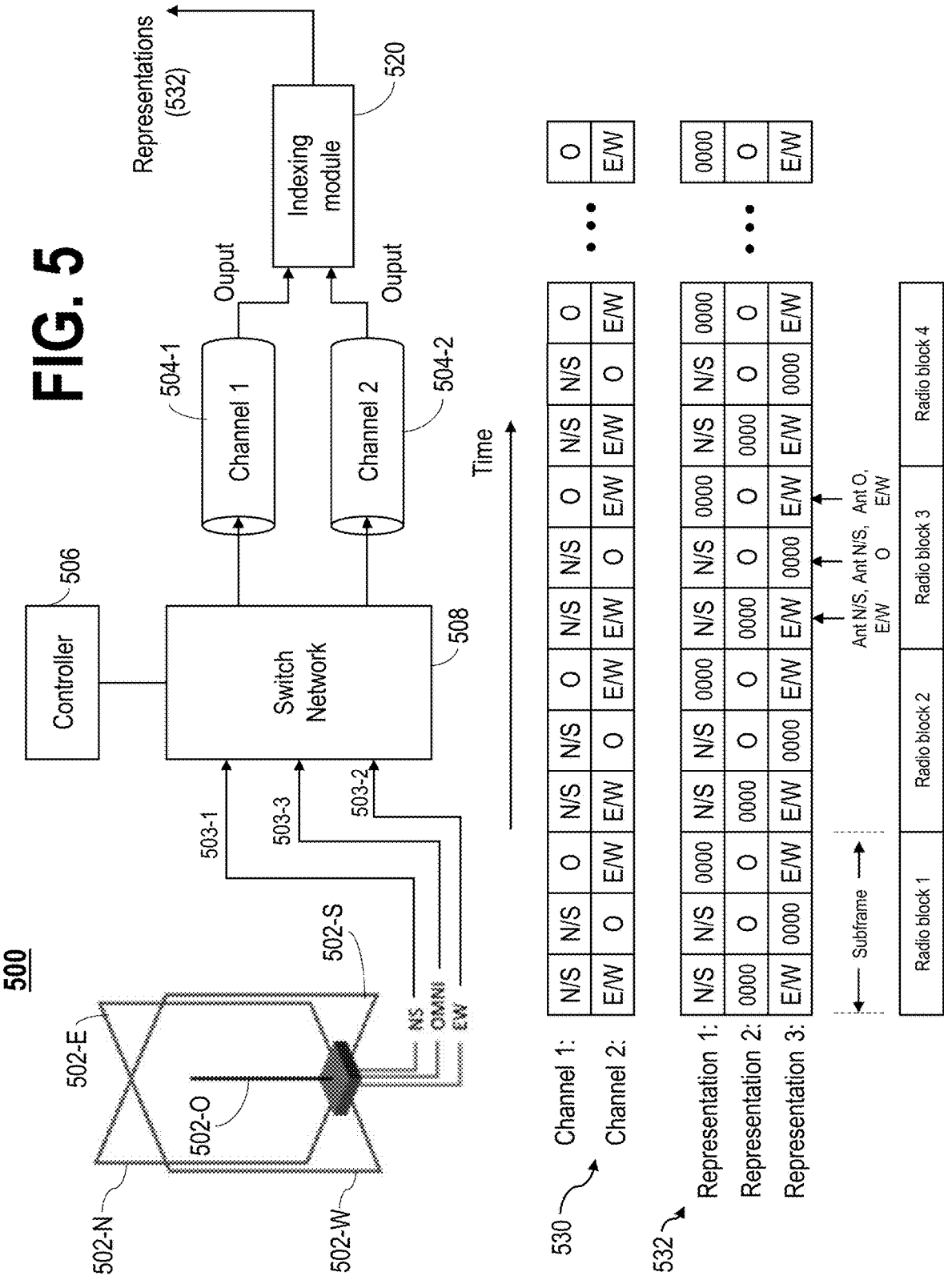

Further, in this example, Channel 1 receives RF signals from only Antenna A among Antennas A-C, e.g., continuously receives RF signals from Antenna A. For example, an output of Antenna A can be directly coupled to an input of Channel 1. It will be understood that this is an example, and that RF systems according to this disclosure need not be configured to have a processing channel that receives RF signals from only a single antenna. For example, the controller 506 and switch network 508, discussed in further detail below with respect to FIG. 5, are configured for commutated detection with respect to all Antennas 502.

Figure 2B:
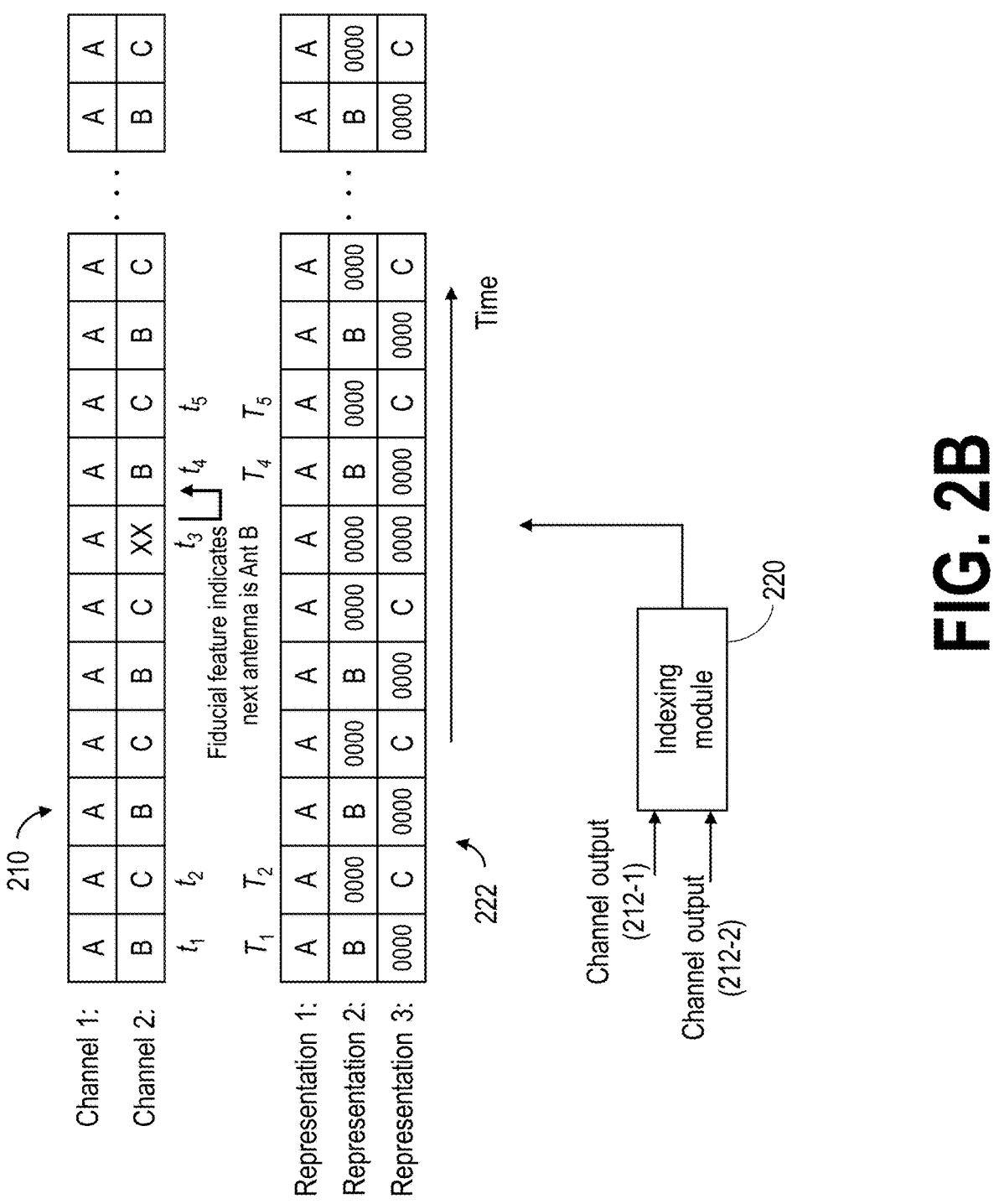

Referring to FIG. 2B, timing table 210 illustrates which processing channel 204 receives signals from which antenna 202 over a set of times (e.g., based at least on control by the controller 206). For example, over a time interval $t_1$, Channel 1 receives an RF signal from Antenna A, and Channel 2 receives an RF signal from Antenna B. During a time interval $t_2$, Channel 1 receives an RF signal from Antenna A, and Channel 2 receives an RF signal from Antenna C (e.g., because a configuration of the switch 208 has been toggled for time interval $t_2$ compared to time interval $t_1$).

The time intervals (e.g., $t_1$ and $t_2$) can be configured differently in various implementations, e.g., can be performed on different timing scales. In some implementations, commutation/switching can occur at the "sampling clock" interval (e.g., such that one digital sample is obtained per antenna switch (e.g., one sample in each of time intervals $t_1$ and $t_2$)). In some implementations, commutation/switching can performed on a chunk of samples (e.g. multiple samples, such as 1000 samples, per switch (e.g., 1000 samples in each of time intervals $t_1$ and $t_2$)). The timing of switching can depend on various factors, such as the type(s) of signals and emissions, the coherence of the array elements of the antenna array, the length(s) of emissions in samples, the signal to noise ratio of received signals, etc. In some implementations, different switching times can be dynamically selected/switched-between, and/or the switching times can be selected at design or operation time to optimize for a chosen task, emitter, and/or scenario.

Each of the processing channels 204 processes the received RF signals and provides respective outputs 212 (212-1, 212-2). For example, output 212-1 can include IQ data of RF signals received at Antenna A, and output 212-2 can include alternating IQ data of RF signals received at Antennas B and C.

In the example of FIG. 2A, RF signals from Antenna A are continuously received by Channel 1, and Channel 2 alternates between receiving RF signals from Antenna B and Antenna C for equal times. Further, over a time interval $t_3$, Channel 2 receives a reference signal (indicated by "XX"), e.g., instead of receiving an RF signal from either Antenna B or Antenna C. The reference signal can be used for asynchronous indexing, discussed below in reference to FIG. 2B. For example, the reference signal can correspond to Channel 2 being coupled to a null termination, to an open circuit, to ground, or to a predetermined constant or non-constant signal (e.g., a predetermined code sequence) that has been predetermined to be the reference signal. For example, the reference signal can be provided to Channel 2 through an optional third input to the switch 208, and the controller 206 can control the switch 208 to couple Channel 2 to the third input at time interval $t_3$.

Referring again to FIG. 1, outputs 116 of the processing channels 104 (e.g., IQ data or other suitable data types) are provided to an input of an indexing module 110, such that the indexing module 110 receives the outputs. For example, in some implementations, the indexing module 110 receives m outputs 116, one output 116 from each of the m processing channels 104. In some implementations, the outputs 116 are processed in one or more suitable operations prior to being received by the indexing module 110, such that the indexing module 110 receives fewer than m inputs, e.g., where the fewer than m inputs represent, encode, or indicate the m outputs 116.

The indexing module 110 is configured to generate one or more representations 118 of the RF signals 108 provided by the antennas 102 based on the outputs 116. For example, in some implementations, the indexing module 110 is configured to generate n representations 118, where each representation 118 represents a single corresponding RF signal 108 provided by a single antenna 102. However, the scope of this disclosure is not limited thereto, and it will be understood that the representations 118 can have various suitable forms and data structures that represent the RF signals 108 based on the outputs 116.

The indexing module 110 can include suitable analog and/or digital circuitry, and/or a programming module (e.g., a program, software application, etc.), configured to generate the one or more representations 118 based on the outputs 116. For example, the indexing module can include programmable digital circuitry such as one or more FPGAs, ASICs, logic gates, logic elements, and/or general-purpose computer devices, that have been programmed to generate the one or more representations 118 based on the outputs 116. For example, the indexing module 110 can be a software module executing on a digital processor.

In some implementations, the indexing module 110 is configured to generate the one or more representations 118 based on an association between antennas 102 and the different corresponding times at which the RF signals 108 are received at the processing channels 104 from the antennas. For example, because of the commutated detection discussed above, the indexing module 110 can receive outputs 212 that are not labeled with their corresponding antenna. The indexing module 110 can use known times or timing patterns at which the RF signals 108 were received to map the outputs 116 to a correct corresponding representation 118, or portion of a representation 118, that is associated with the antenna that provided the RF signal represented in the outputs 116. The representations 118 can be stored in a buffer.

For example, referring to FIG. 2B, an indexing module 220 of the system 200 (which can have the characteristics described for the indexing module 110) receives the outputs 212 and generates representations 222 based on the output 212. In this example, the representations 222 include three representations: Representation 1, Representation 2, and Representation 3, corresponding to Antenna A, Antenna B, and Antenna C, respectively. The representations 222 include, represent, and/or indicate, for each of a plurality of times, RF signals (or a lack thereof) received from each of the antennas 202 at that time. For example, the indexing module 220 can generate Representation 1 to include IQ values representing RF signals from Antenna A; can gener-ate Representation 2 to include IQ values representing RF signals from Antenna B; and can generate Representation 3 to include IQ values representing RF signals from Antenna C. The outputs 212 are interleaved into three total representations 222 (e.g., three total tensors). The challenge of indexing is to correctly associate IQ values from each antenna 202 with their corresponding representation 222.

For example, as discussed above, during time interval $t_1$, Channel 1 receives an RF signal from Antenna A, and Channel 2 receives an RF signal from Antenna B. Further, the representations 222 each include elements/portions corresponding to times of receiving RF signals, e.g., element (or portion) $T_1$ corresponding to times $t_1$. As shown in FIG. 2B, the element $T_1$ of Representation 1 includes data representing the RF signal received from Antenna A at times $t_1$; the element $T_1$ of Representation 2 includes data representing the RF signal received from Antenna B at times $t_1$; and the element $T_1$ of Representation 3 includes a predetermined dummy or null set of one or more values indicating that RF signals were not received at the processing channels 204 from Antenna C at times $t_1$. For example, the element $T_1$ of Representation 3 can be entirely one or more zeros, represented in FIG. 2B as "0000." This type of element can be stored in/as any suitable way to indicate that the data of the element does not correspond to captured values of RF signals.

Further, at times $t_2$, Channel 1 receives an RF signal from Antenna A, and Channel 2 receives an RF signal from Antenna C. The element $T_2$ of Representation 1 (corresponding to times $t_2$) includes data representing the RF signal received from Antenna A at times $t_2$; the element $T_2$ of Representation 2 includes a predetermined dummy or null set of one or more values indicating that RF signals were not received at the processing channels 204 from Antenna B at times $t_2$; and the element $T_2$ of Representation 3 includes data representing the RF signal received from Antenna C at times $t_2$.

In some implementations, elements of the representations 222 are based on, include, or are the outputs 116 of the processing channels 104. For example, the processing channels 204 can be configured to output digital IQ data as the outputs 212, and the elements of the representations 222 can be digital IQ data (reflecting complex-valued sampling). For example, the element $T_2$ of Representation 3 can be digital IQ data representing an analog RF signal received at Channel 2 from Antenna C at times $t_2$. Representations as described herein are not limited to digital IQ data. For example, in some implementations, the representations can reflect real-valued sampling, e.g., without in-phase and quadrature mixers. The representations can include data of sampled analog signals in time, I/Q, and/or another suitable basis function.

In some implementations, the representations 118 include tensors or other representations of samples in one or more dimensions (e.g. lists, grids, vectors, etc.). For example, each of Representation 1, Representation 2, and Representation 3 of FIG. 2B can be a tensor, and/or a combined tensor can include each of Representation 1, Representation 2, and Representation 3. The tensor(s) can be time-domain tensors, e.g., where a dimension of the tensor corresponds to a plurality of RF signal receiving times (e.g., times $t_1$ and $t_2$). In some implementations, the representations 118 are frequency-binned, e.g., over multiple ports/channels. It will be understood that the representations 118 are not limited to any particular structure, and that any data structure suitable for subsequent processing for spatial estimation can be used.

In some implementations, the representations 118 can be referred to as "sparse," because the representations 118 include, for at least some times for at least some of the antennas, no data corresponding to RF signals received from the antennas. For example, in the case of the representations 222, each of Representation 2 and Representation 3 is sparse, with 50% of each representation being formed of dummy values (e.g., all zeros).

Various methods can be used by the indexing module 110 to generate the representations 118, e.g., to determine which representation 118 should include data from a given time, so that the representations 118 correctly correspond to the antennas 102. FIGS. 2A-2B illustrate an example of "asynchronous" indexing. In some implementations of asynchronous indexing schemes, a fiducial feature is introduced into the outputs 116. The fiducial feature provides a reference time-point for the indexing module 110, based on which the indexing module 110 can correctly align elements of the representations 118 with corresponding times and antennas.

For example, as shown in FIGS. 2A-2B, in some implementations the fiducial feature is a lack of RF signals from antennas at a particular time or set of times. In this example, the controller 206 is configured to control the switch 208 such that, during time interval $t_3$, Channel 2 receives RF signals from neither Antenna B nor Antenna. Rather, for example, Channel 2 can receive a ground signal, an open-circuit signal, and/or another predetermined signal that is readily distinguishable from RF signals provided by the antennas 202. For example, in some implementations the signal is a constant signal corresponding to a set of zeros in an IQ form or other form of the outputs 212). For example, the switch 208 can include a third input connected to ground 214, and the controller 206 can connect the ground to Channel 2 during times $t_3$. As another example, the switch 208 can be disconnected (from Antennas B and C, or from Channel 2) during times $t_3$. However, schemes for providing the signal are not limited to the foregoing.

This distinguishable signal can be referred to as a reference signal. In the timing table 210, reception of the reference signal at Channel 2 is represented as "XX." The reference signal corresponds to (e.g., is represented by) corresponding data (a fiducial feature) in the outputs 212. For example, output 212-1 can include, as data corresponding to times $t_3$, a digital representation (e.g., digital IQ data) of an RF signal received by Channel 1 at times $t_3$, and output 212-2 can include, as data corresponding to times $t_3$, a digital representation of the reference signal, e.g., a set of all zeros or another predetermined signal level, a predetermined and distinguishable sequence/pattern, a padding added to the data (e.g., a zero-padding), or another distinguishable data feature.

As shown in FIG. 2B, the fiducial feature in the channel output 212-2 corresponding to times $t_3$ can be used by the indexing module 220 to associate Antennas B and C with corresponding detection times. For example, the fiducial feature corresponding to times $t_3$ can indicate to the indexing module 220 that a next set of data output from Channel 2 (e.g., at times $t_4$) corresponds to Antenna B. The indexing module 220 can detect the presence of the fiducial feature (e.g., using comparison logic or another suitable method) and can generate element T4 of Representation 2 (corresponding to Antenna B) to include the channel output 212-2 corresponding to times $t_4$, based on detecting the fiducial feature.

Further, the indexing module 220 can apply a predetermined timing pattern that indicates mappings between times and antennas, to generate elements of the representations 222 for subsequent times. For example, the predetermined timing pattern can be that, after the fiducial feature, the next-received data corresponds to Antenna B, and that, subsequently, Antennas B and C alternate in time. Based on this predetermined timing pattern, the indexing module can generate T5 of Representation 3 (corresponding to Antenna C) to include the channel output 212-2 corresponding to times t5. The predetermined timing pattern can be accessible to the indexing module 220, e.g., stored in a memory or storage of the indexing module 220.

The indexing module 220 can apply the fiducial feature for asynchronous indexing using various suitable signal processing and timing methods. For example, a high or low power, a comparison of noise power, or transient edges (e.g., rising or falling edges) can allow for alignment to the timing of the commutation sequence, providing a known reference timing for indexing.

In some implementations, the reference signal is included in the signals provided to the processing channels 104 periodically and/or in response to one or more events, e.g., in response to a control signal provided to the controller 106 that causes the controller 106 to cause insertion of the reference signal. Based on periodic insertion of a fiducial feature, timing misalignments between RF signals and generated representations of the RF signals can be reduced or avoided, e.g., because a common timing is periodically established before any relative timing drift between the controller 106 and the indexing module 110 can cause data to be included in the wrong representation 118 and/or in the wrong element within a representation 118. Some implementations of the asynchronous indexing do not include and/or require a common, aligned timing between the indexing module 110 and commutation.

In some implementations, instead of or in addition to asynchronous indexing based on fiducial features in the outputs 116 of the channels 104, synchronous indexing can be performed based on a common timing between (i) commutation of receiving RF signals 108 from the antennas 102 (e.g., by the controller 106) and indexing by the indexing module 110. For example, the indexing module 110 can receive a timing signal (e.g., a timing signal separate from the outputs 116 of the channels 104) that can be used by the indexing module 110 to obtain an association between the antennas 102 and the different corresponding times at which RF signals 108 from the antennas 102 are received at the channels 104.

Figure 2C:
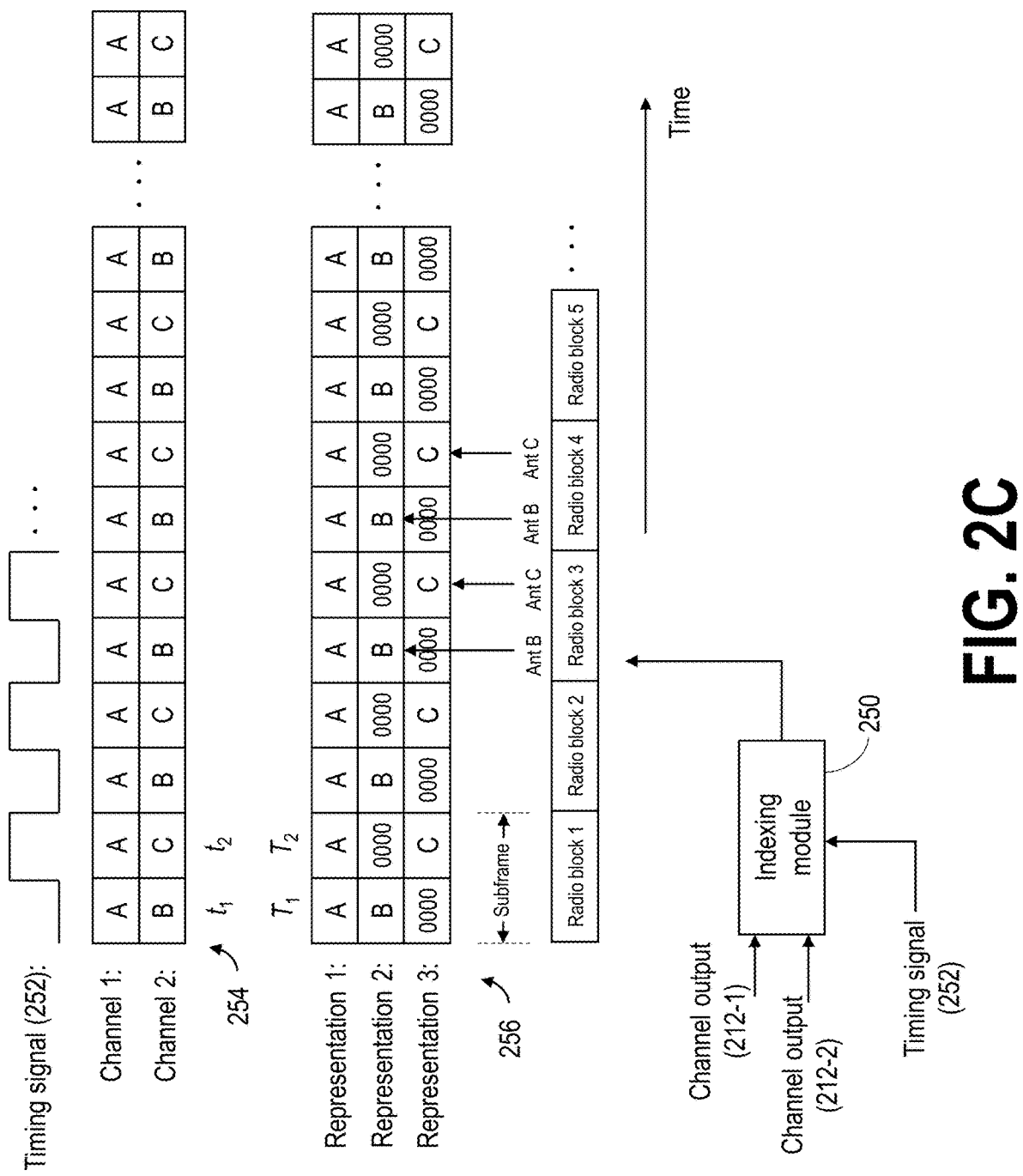

FIG. 2C shows an example in which the system 200 of FIG. 2A is configured to perform synchronous indexing (e.g., without requiring—though optionally including—the introduction of the fiducial feature corresponding to times $t_3$). In this example, the indexing module 250 receives a timing signal 252, e.g., a clock signal or another periodic signal with which the indexing module 250 can perform triggering to establish shared timing with antenna commutation. For example, the timing signal 252 can be received at a general purpose input/output (GPIO) of a device that implements the indexing module 250 (e.g., a computing device that executes the indexing module 250 as a software component), or can be received at a clock input of the device. Based on the timing, fixed portions of the output 212 are processed by the indexing module in alignment with antenna communication, e.g., in alignment with switching intervals of the switch 208 as controlled by the controller 206.

For example, as shown in FIG. 2C, the RF signals are received by the channels 204 as sets of fixed subframes corresponding to radio blocks. Multiple of the fixed subframes can correspond to a fixed frame, e.g., 1024 samples. Each subframe corresponds to two time intervals of RF signal processing by the processing channels 204. In each time interval of the two time intervals, the processing channels 204 receive and process RF signals from a particular fixed set of the antennas 202, and commutation may be performed such that the set of antennas is different for different time intervals. In the example of FIG. 2C, times $t_1$ and $t_2$ are time intervals that together correspond to a subframe and radio block, as indicated by the timing table 254. The timing signal 252 has a period that matches the time duration corresponding to the subframe and radio block. Further, in this example, "low" intervals of the timing signal 252 correspond to processing RF signals from Antennas A and B, and "high" intervals of the timing signal 252 correspond to processing RF signals from Antennas A and C. It will be understood that the timing shown in FIG. 2C is an example, and that any suitable timing (e.g., with respect to radio blocks, frames, subframes, etc.) is within the scope of this disclosure.

In some implementations, the portions/intervals of RF signal data according to which commutation is performed, or portions thereof (e.g., radio blocks or subframes) correspond to chunks in which data is written from the radio receiver hardware (e.g., the channels 104) to a digital processor or other computing element (e.g., a processor on which the indexing module 110 is implemented). For example, this write can be a write from an ADC or other RFIC component directly into a memory of the processor or graphics processing unit (GPU), or other memory unit, that performs subsequent processing. In some implementations, the transfer of the data in these or other chunks can improve the efficiency (e.g., speed) of the data transfer.

The indexing module 250 is configured to generate representations 256 in synchronicity with the timing signal 252. For example, there is a predetermined correspondence between characteristics of the timing signal (e.g., period, half-period, etc.) and times at which RF signals 108 from different antennas 102 were received and processed by the processing channels 104.

The indexing module 250 uses this correspondence and the received timing signal 252 to generate the representations 256. For example, as shown in FIG. 2C, the predetermined correspondence states that alternating intervals/half-subframes, corresponding to low/high portions of the timing signal 252, correspond to Antenna B and Antenna C, respectively. The indexing module 250 can trigger to the timing signal 252 (e.g., rises or falls of the timing signal 252) to establish a shared timing with the commutation (e.g., switch control).

For example, the controller 206 can be caused to switch at a fixed timing boundary, such as when "sample_count" modulo a fixed value (e.g., 1024) is equal to zero (sample_count %1024==0)). In this case, sample_count is known to start from zero, and switching occurs every 1024 samples. Moreover, in some implementations, the chunks of data transferred from the channels 204 to the indexing module 250 can have the same size, e.g., the chunks can be 1024-sample chunks. This configuration can facilitate effective and convenient de-interleaving, because switching times and block transfer times have been aligned synchronously. For example, the GPIO pins can be set high or low synchronously with the sample clock at fixed sample counts.

In some implementations, the timing signal 252 is generated by the controller 206 and provided by the controller 206 to the indexing module 250. In some implementations, the timing signal 252 is generated by the indexing module 250 and provided by the indexing module 250 to the controller 206. In some implementations, the controller 206 and the indexing module 250 can each receive the timing signal 252 as generated by another device, system, or module. In some implementations, different but synchronous timing signals are received by, generated by, or otherwise obtained by the controller 206 and the indexing module 250, e.g., having periods that are integer multiples of one another. The controller 206 can control the switch 208 in synchronicity with the timing signal 252, and the indexing module 250 can generate the representations 256 in synchronicity with the timing signal 252, such that representation generation and switching are in synchronicity with each other. Accordingly, the indexing module 250 can generate the representations 256 based on an association between the antennas 202 and different corresponding times at which RF signals from the antennas 202 are received at the processing channels 204; the association is obtained based on the timing signal 252, which assures that time elements of the representations 256 (e.g., $T_1$ and $T_2$) correspond to time intervals of commutation (e.g., $t_1$ and $t_2$).

Other implementations of synchronous indexing are also within the scope of this disclosure. For example, in some implementations, synchronous indexing is performed based on close integration between the controller 106 and the indexing module 110, e.g., without requiring (though optionally including) a common timing signal.

It will be understood that the particulars of the commutation and indexing schemes shown in FIGS. 2A-2C are examples and can be suitably modified for various sets (e.g., numbers and arrangements) of antennas, channels (e.g., number of channels), representations (e.g., number and form of representations), and indexing schemes. For example, the shape and period with respect to commutation of the timing signal can vary from that shown in FIG. 2C; a timing and/or periodic insertion of the fiducial feature with respect to commutation can vary from that shown in FIGS. 2A-2B; and an overall timing pattern of commutation can vary from that shown in FIGS. 2A-2C. For example, FIGS. 4-5 illustrate examples of RF systems that implement different commutation schemes.

Figure 4:
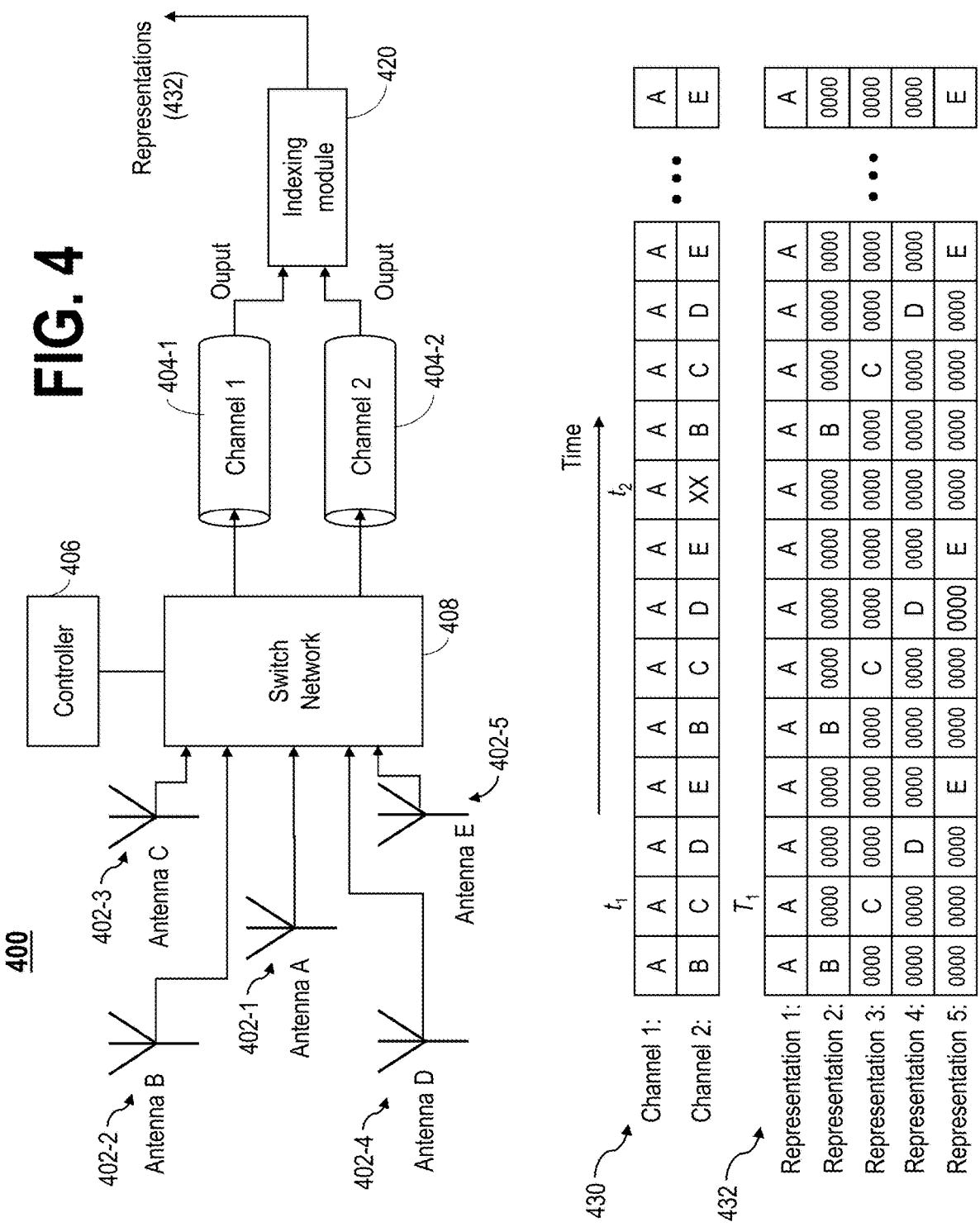
FIGS. 4-5 are diagrams illustrating examples of RF systems.

FIG. 4 illustrates another example of an RF system 400. The RF system 400 includes five antennas 402 (402-1, 402-2, 402-3, 402-4, 402-5), a controller 406, a switch network 408, two processing channels 404 (404-1, 404-2), and an indexing module 420. The system 400 is an example of a portion of the system 100, e.g., where the antennas 402 are examples of the antennas 102, the processing channels 404 are examples of the processing channels 104, the controller 406 is an example of the controller 106, and the indexing module 220 is an example of the indexing module 110. Description applied to elements of the systems 100 and 200 can be equally applied to corresponding elements of the system 400, and vice-versa, except where noted or made clear from context otherwise.

The antennas 402 can be arranged in various positions. In some implementations, the antennas 402-2 to 402-5 are arranged in a square or rectangle pattern around a central antenna 402-1 at the center of the square or rectangle; however, arrangements are not limited thereto. For example, in cases of deployment on crewed or uncrewed vehicles, antenna locations may be irregular or arbitrary. Accordingly, various different configurations can be used for compatibility with various deployment scenarios. In some implementations, the arrangement advantageously includes a central antenna, which can provide a stable phase center for comparison of signals from other antenna elements (e.g., in computing a cross-covariance matrix as discussed with respect to FIG. 7).

In this example, as shown in the timing table 430, RF signals output from Antenna A are continuously provided to Channel 1 (Antenna A is continuously sampled). Further, the controller 406 is configured to control the switch network 408 to cause commutated reception of RF signals from Antennas B-E at Channel 2, e.g., in a repeating sequence B-C-D-E. A reference signal (indicated by "XX" in the timing table 430) is, at certain times (e.g., periodically), provided to Channel 2, resulting in a corresponding presence of fiducial features in the output of Channel 2 (e.g., IQ data). The indexing module 420 can use the timing of the fiducial feature to obtain an association between times and corresponding antennas 402, and use the association to generate representations 432. In this example, the representations 432 include five representations (e.g., five tensors) corresponding to the five antennas A-E. Data elements of the representations 432 correspond to times (e.g., time intervals), and the content of each data element corresponds to (e.g., represents) an RF signal provided by one of the antennas 402 to the processing channels 404 at that time (e.g., over that time-interval). For example, as shown in FIG. 4, an element $T_1$ of Representation 3 includes data representative of RF signals received at time $t_1$ from Antenna C. Tensors 2-5, corresponding to Antennas B-E, are sparse, including elements (indicated by "0000" in FIG. 4) that indicate a lack of RF signals from the corresponding antenna at the corresponding time-point. In this case, Representation 1 is not sparse, e.g., each element of Representation 1 includes data representative of an RF signal received at the processing channels 404 from Antenna A. Representations 2-5 include data representative of RF signals in every fourth element, corresponding to the four-fold commutation of Antennas B-E for Channel 2.

The five-antenna system 400 having the configuration shown in FIG. 4 has more degrees of freedom than the three-antenna system 200, but has the same two-channel arrangement (e.g., can use the same two-channel digital receiver platform). The increased cost associated with an extra two antennas, and a modified switch network to accommodate commutation of the extra two antennas, may be relatively small, e.g., compared to a cost associated with increased channel count. In addition, the additional power usage, weight, and/or spatial footprint may be small compared to the additional power usage associated with a higher channel count. The use of more antennas (e.g., for the same number of channels, or for a number of channels that scales more slowly than the number of antennas) can, in some implementations, provide increased array resolution, improved localization accuracy, improved localization precision, and/or improved suppression of localization ambiguity. Moreover, the use of an increased number of antennas can wholly or partially resolve additional degrees of resolution for off-plane localization (e.g., for estimation of emitter elevation in addition to emitter azimuth). These and/or other advantages can be realized, in some implementations, with fewer processing channels, or fewer utilized processing channels, than antennas. This example illustrates the efficient technical advantages that may be gained using the commutation/indexing methods and systems discussed herein, e.g., in combination with machine learning-based spatial estimation, discussed in further detail below with respect to FIG. 7.

Although FIG. 4 shows the system 400 configured to use asynchronous indexing based on a fiducial feature, the system 400 can instead or additionally be configured for synchronous indexing, e.g., as described in reference to FIG. 2C.

FIG. 5 illustrates another example of an RF system 500. The RF system 500 includes an Adcock/Watson-Watt antenna array including five antennas 502 (502-N, 502-5, 502-E, 502-W, 502-0). RF signals from the North/South antennas 502-N and 502-S are combined into a single antenna output port 503-1 (e.g., using a transformer), and RF signals from the East/West antennas 502-E and 502-W are combined into a single antenna output port 503-2. RF signals from the "omnidirectional" antenna 502-0 are output through a third antenna output port 503-3. Accordingly, this example includes multi-element antenna ports, unlike the systems 200 and 400 in which RF signals from each antenna 202, 402 are output individually.

In some implementations, the antennas 502-N, 502-5, 502-E, 502-E are directional antennas (e.g., configured to detect signals along orthogonal axes), and the antenna 502-0 is an omnidirectional antenna. However, implementations are not limited to that configuration. The antennas 502 can be arranged in various positions. In some implementations, the antennas 502-N, 502-5, 502-E, 502-W are arranged in a square or rectangle pattern around a central antenna 502-0 at the center of the square or rectangle; however, arrangements are not limited thereto.

The RF system 500 further includes a controller 506, a switch network 508, two processing channels 504 (504-1, 504-2), and an indexing module 520. The system 500 is an example of a portion of the system 100, e.g., where the antennas 502 are examples of the antennas 502, the processing channels 504 are examples of the processing channels 104, the controller 506 is an example of the controller 106, and the indexing module 520 is an example of the indexing module 510. Description applied to elements of the systems 100, 200, and 400 can be equally applied to corresponding elements of the system 500, and vice-versa, except where noted or made clear from context otherwise.

Figure 6A:
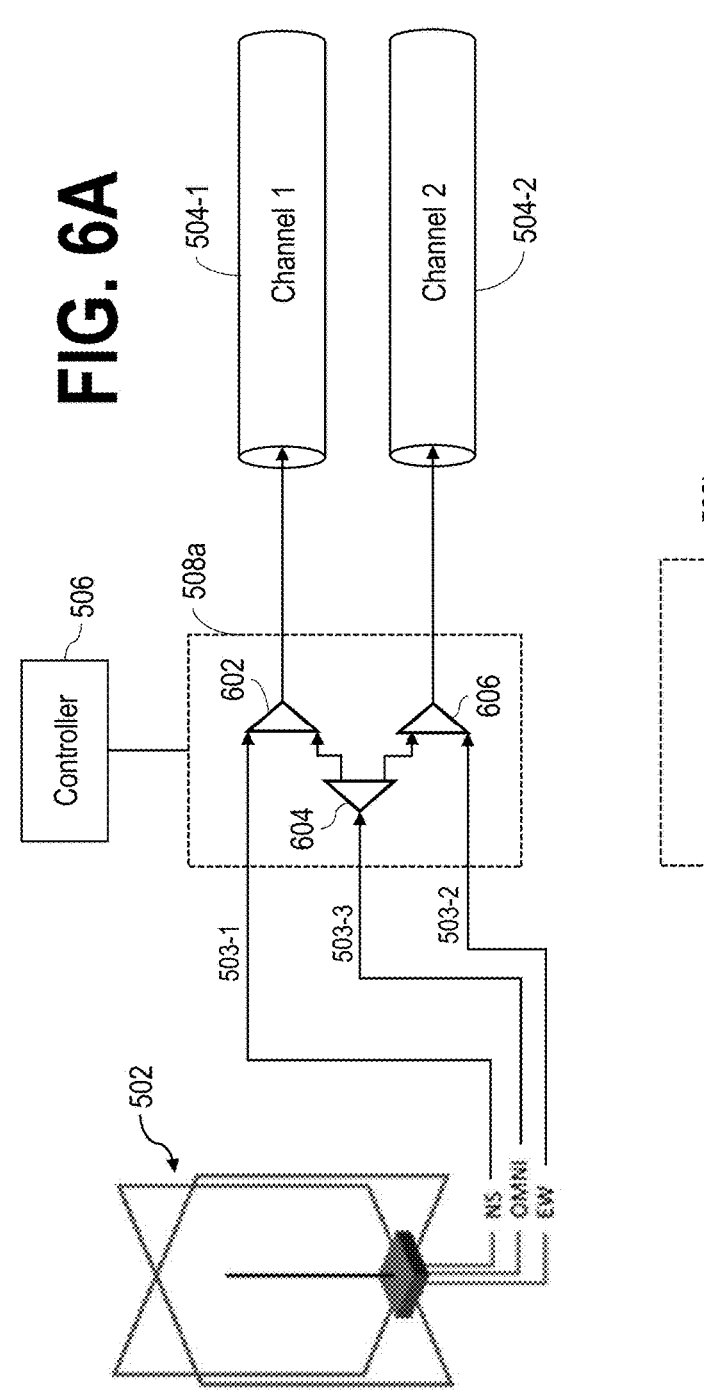
FIGS. 6A-6B are diagrams illustrating examples of switch networks.
Figure 6B:
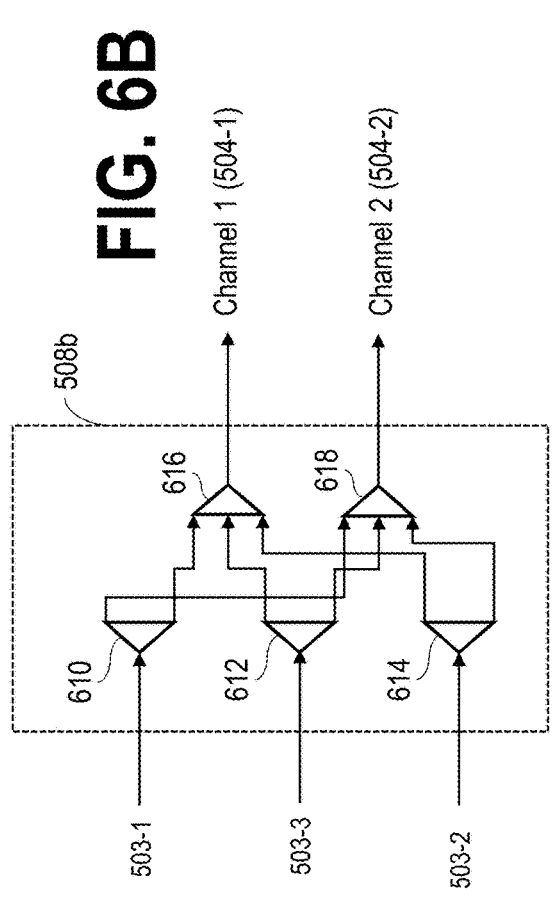

The controller 506 is configured to control the switch network 508 to combine the N/S (503-1), E/W (503-2), and 0 (503-3) outputs pairwise in an interleaved fashion into the processing channels 504 (examples of the switch network 508 are shown in FIGS. 6A-6B. As shown in the timing table 530, the commutation pattern includes a repeating series of three time intervals, e.g., $t_1$, $t_2$, and $t_3$. In interval $t_1$, RF signals from output ports 503-1 and 503-2 are sampled by Channels 1 and 2, respectively. In interval $t_2$, RF signals from output ports 503-1 and 503-3 are sampled by Channels 1 and 2, respectively. In interval $t_3$, RF signals from output ports 503-3 and 503-2 are sampled by Channels 1 and 2, respectively. This commutation scheme is an example of an effective way to handle spatial estimation using widely-used array types, such as Adcock/Watson-Watt antenna arrays, using two channel ports (and two corresponding channels) for three RF signal output ports instead of three channel ports for three RF signal output ports.

In this example, no antenna or combination of antennas is sampled continuously. Moreover, in this example, RF signals from Antenna 502-0 are sampled by multiple processing channels at different corresponding times. It will be understood that one or both of these characteristics can be applied to various implementations according to this disclosure and are not limited to the specific example shown in FIG. 5.

RF signals received as shown in the timing table 530 are processed by the processing channels 504 to produce respective outputs that are provided to the indexing module 520. The indexing module 520 employs a synchronous indexing scheme (e.g., based on a common or related timing signal) to generate three representations 532. Representation 1 represents (e.g., as digital IQ data) RF signals output from output port 503-1 (a combination of outputs from antennas 502-N and 502-S); Representation 2 represents RF signals output from output port 503-2 (a combination of outputs from antennas 502-E and 502-W); and Representation 3 represents RF signals output from output port 503-3, from antenna 502-0. The representations 532 can have various forms, e.g., time-domain tensors as described in reference to FIGS. 2A-2C and 4. As shown in FIG. 5, each representation 532 is sparse, because none of the RF signal outputs 503 are sampled continuously.

FIGS. 6A-6B illustrate examples 508a and 508b, respectively, of the switch network 508. The switch network 508a of FIG. 6A includes three switches 602, 604, 606. Switch 604 receives an input from output port 503-3 (corresponding to antenna 502-0) and can be switched between outputting to an input of switch 602 and an input of switch 606. Switch 602 receives an input from the switchable output of switch 604 and an input from output port 503-1 (corresponding to antennas 502-N and 502-S). Switch 602 receives an input from the switchable output of switch 604 and an input from output port 503-2 (corresponding to antennas 502-E and 502-W). Accordingly, the controller 506 can control the switches 602, 604, 606 (e.g., in accordance with, or based on, a timing signal associated with synchronous indexing), for example, to provide RF signals from antenna 502-0 and antennas 502-N/S to Channel 1 in a commutated manner, and to provide RF signals from antenna 502-0 and antennas 502-E/W to Channel 2 in a commutated manner, as shown in the timing table 530, or in accordance with another commutation scheme.

The switch network 508b of FIG. 6B includes five switches 610, 612, 614, 616, 618. Switches 610, 612, 614 receive RF signals from output ports 503-1, 503-3, and 503-2, respectively, and each provide switchable outputs to inputs of switches 616, 618. Switches 616, 618 each receive three inputs from outputs of the three switches 610, 612, 614, and selectively output one of the three inputs to Channel 1 or Channel 2, respectively. The controller 506 can control the switches 610, 612, 614, 616, 618 in accordance with the timing table 530 or another commutation scheme.

The switch network 508a efficiently uses only three switches to achieve commutation. The switch network 508b, advantageously, can provide RF signals from any antenna 502 to either channel 504, permitting a wider variety of commutation schemes.

Although FIG. 5 shows the system 500 configured to use synchronous indexing (e.g., based on a timing signal), the system 500 can instead or additionally be configured for asynchronous indexing, e.g., as described in reference to FIGS. 2A-2B.

Referring again to FIG. 1, the one or more representations 118 of the RF signals 108 are provided to a spatial estimation module 112. The spatial estimation module 112 is configured to execute a machine learning model 114 based on the representations 118 and to determine, based on an output of the machine learning model, a spatial estimate 120 for an emitter of the RF signals 108. For example, the machine learning model 114 can be configured to receive, as input, digital RF data (representing RF signals) obtained in a commutated detection configuration, and to provide, as output, based on the digital RF data, a spatial estimate 120. The spatial estimate 120 includes or indicates a position of an emitter of the RF signals. The spatial estimation module 112 can perform one or more preprocessing steps on the representations 118 and provide the results as input to the machine learning model 114.

The spatial estimation module 112 can include suitable analog and/or digital circuitry, and/or a programming module (e.g., a program, software application, etc.), configured to execute the machine learning model 114 and determine the location. For example, the spatial estimation module 112 include programmable digital circuitry such as one or more FPGAs, ASICs, and/or general-purpose computer devices, that have been programmed to execute the machine learning model 114 and determine the location, e.g., by performing operations described herein. For example, the indexing module 110 can be a software module executing on a digital processor. In some implementations, two or more of the controller 106, the channels 104 (or portions thereof), the indexing module 110, and the representation 118 can include software modules executing on a common computing device, e.g., a computing device of a digital receiver.

Figure 7:
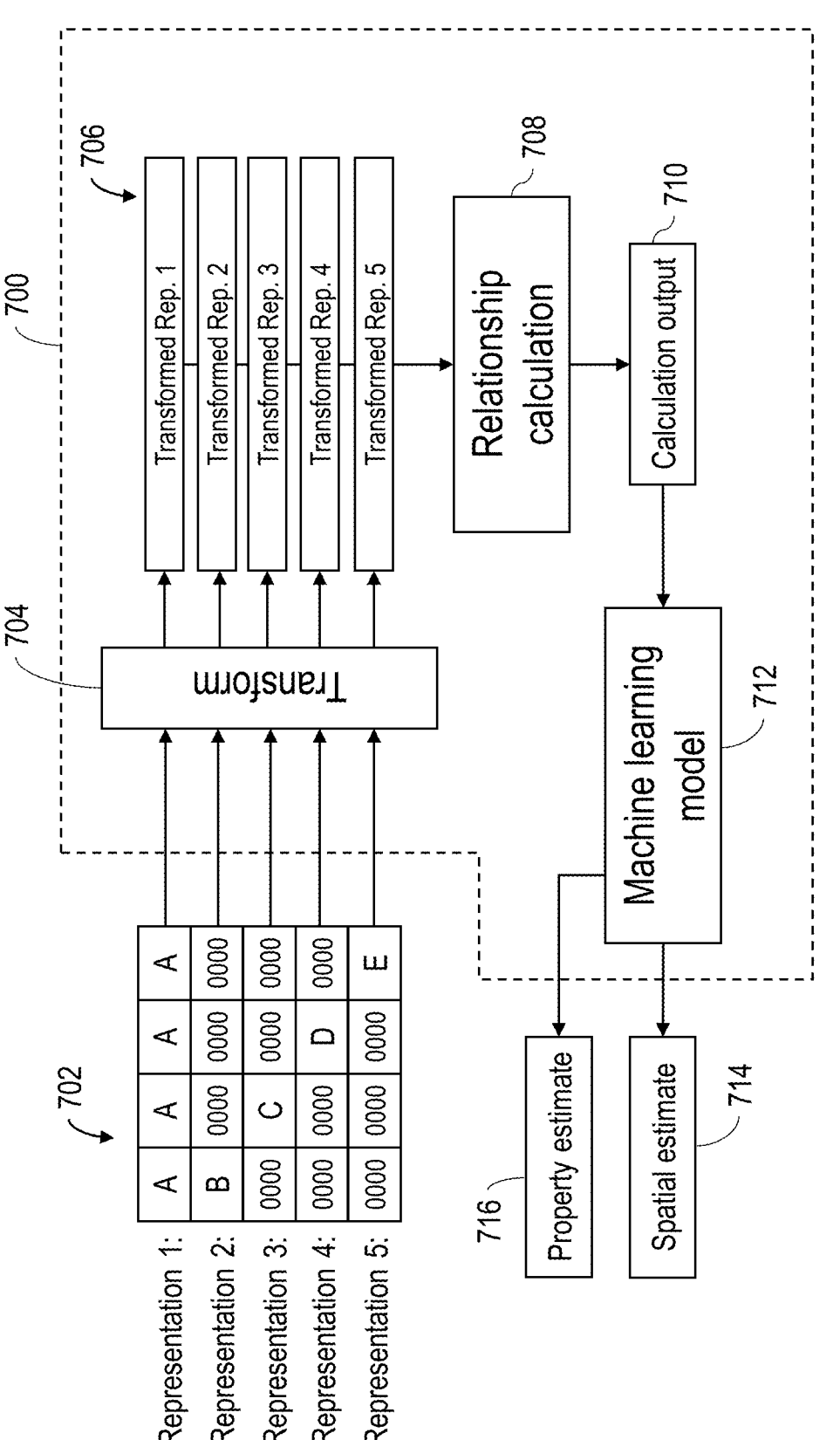
FIG. 7 is a diagram illustrating an example of spatial estimation.

The spatial estimation module 112 can have any of various architectures suitable for performing the operations described herein. FIG. 7 illustrates an example of a spatial estimation module 700 according to some implementations. The spatial estimation module 700, or variations/adaptations thereof as discussed herein, can be used, for example, as the spatial estimation module 112 and can be used in conjunction with any of the systems 200, 400, 500, 900 and/or other RF systems within the scope of this disclosure. In the following sections, references to the spatial estimation module 700 are also applicable to the spatial estimation module 112, and vice versa, and these are used interchangeably.

The spatial estimation module 700 receives representations 702 (in this example, five representations 702, without being limited thereto), e.g., five time-domain tensors. The representations 702 can be generated by any of the indexing modules described herein, e.g., as described in reference to FIGS. 1, 2A-2C, and 4-5, such as the indexing module 110. In this example, Representation 1 includes data representing RF signals continuously sampled from a first antenna (Antenna A), and Representations 2-5 are sparse representations that include data representing RF signals sampled at different corresponding times from second through fifth antennas (Antennas B-E). For example, the representations 702 can be the representations 432 of FIG. 4, but are not limited thereto; the representations 702 can be similar to the representations 118 and other representations described herein.

As shown in FIG. 7, the spatial estimation module 700 can be configured to perform a transform 704 on the representations 702 to generate corresponding transformed representations 706 (transformed samples), e.g., in a one-to-one relationship. The transform 704 can be a digital transform acting on digital representations 118 (e.g., digital IQ samples). In some implementations, the transform 704 is a Fourier transform (e.g., a digital fast Fourier transform (FFT)). The use of an FFT can allow the representations 702 to be separated into different frequency bands or sub-bands of the full-bandwidth signal, such that subsequent computations (e.g., correlation computations) can be computed on different signals or signal components in different bands or sub-bands, in some implementations promoting more-accurate and/or efficient estimation. Other types of transforms are also within the scope of this disclosure, such as higher-dimension Fourier transforms, spatial binning, wavelet transforms, and/or other transforms which separate signals or signal components based on basis functions or domains in the input signal space.

The transformed representations 706 represent each representation 702 and each correspond to an antenna or combined output of multiple antennas (e.g., antennas 502-N and 502-5). For example, in some implementations the transformed representations 706 represent the representations 702 in a different domain that the representations 702. For example, in the case of a Fourier transform, the representations 702 can be time-domain representations (e.g., time-domain tensors), and the transformed representations 706 can be frequency-domain representations (e.g., frequency-domain tensors). In some implementations, the transform 704 includes a binning process, e.g., transforming the representations 702 on the basis of frequency bins or bands or discrete wavelet transform (DWT) bins or bands.

The spatial estimation module 700 is further configured to perform a relationship calculation 708 between the transformed representations 706, to produce a calculation output 710. For example, in some implementations, the relationship calculation 708 is a pairwise cross-correlation or cross-covariance between the transformed representations 706, and the calculation output 710 includes cross-correlation matrices or cross-covariance matrices. For example, the calculation output 710 can be a cross-covariance spectrum. For example, in the case of FIG. 7 in which there are five representations 702 and five transformed representations 706, a 5×5 square matrix (e.g., a covariance spectrum) can be computed, as the calculation output 710, for each frequency bin or band of the transformed representations 706. Other measures of relationships between the transformed representations 706 are also within the scope of this disclosure.

In some implementations, the relationship calculation 708 can advantageously improve the accuracy and/or reliability of spatial estimation. Spatial modes can often be estimated from the relative phase or time-delay of signal arrival at different array elements, as illustrated, for example, by the angular arrival of a ray upon a uniform linear array resulting in shifts relative to the cosine of the arrival angle times the signal wavelength. The relationship calculation 708 provides a generalized measure for capturing the relative phase offsets between an arbitrary set of elements in a pair-wise or more-than-pair-wise manner across an arbitrary number of array elements.

Other examples of pre-processing operations that can be performed on the representations 702 or derivatives thereof, to obtain inputs to the machine learning model 712, include filtering, tuning, resampling, rate changing, and normalization, to provide several non-limiting examples. In some implementations, the machine learning model 712 is similar to the machine learning model 114. Accordingly, references to the machine learning model 712 in the following sections is also applicable to the machine learning model 114 in some implementations.

The calculation output 710 (in some cases, with other or additional pre-processing operations performed) is provided as input to a machine learning model 712 executed by the spatial estimation module 700. The machine learning model 712 is configured to receive, as input, digital RF data (representing RF signals) obtained in a commutated detection configuration, and to provide, as output, based on the digital RF data, a spatial estimate 714. The spatial estimate 714 includes or indicates a position of an emitter of the RF signals. In the example of FIG. 7, the machine learning model 712 is configured to receive, as input, the calculation output 710, e.g., a covariance spectrum.

The machine learning model 712 can include any one or more suitable types of machine learning network and/or parametric function, including neural network(s), e.g., convolutional neural networks, recurrent neural networks, feed-forward neural networks, perceptron networks, deep neural networks, etc. Further examples of the machine learning model 712 include classification models, large language models, and regression models. The machine learning model 712 can be trained based on supervised, semi-supervised, unsupervised and/or reinforcement learning. The machine learning model 114 can be configured with one or more approaches, such as back-propagation, gradient boosted trees, decision trees, support vector machines, reinforcement learning, partially observable Markov decision processes (POMDP), and/or table-based approximation, to provide several non-limiting examples. Based on the type of the machine learning model 712, training (discussed in further detail below with respect to FIG. 9) can include adjustment of one or more parameters. For example, in the case of a regression-based model, the training can include adjusting one or more coefficients of the regression so as to minimize a loss function such as a least-squares loss function. In the case of a neural network, the training can include adjusting weights, biases, number of epochs, batch size, number of layers, and/or number of nodes in each layer of the neural network, so as to minimize a loss function. The machine learning model 712 can include a single network/model/function or can include two, three, or more networks that together are trained to provide outputs for use in spatial estimation, as described herein. When the machine learning model 712 includes two or more networks, inputs/outputs of the networks can be entirely distinct/independent, and/or an output of one network can be provided as input to another network, without departing from the scope of this disclosure.

In some implementations, the machine learning model 712 includes a neural array transform. For example, the machine learning model 712 can be a deep neural network that has one or more of various feature/architectures such as fully connected networks, transformers, convolutional layers, residual layers, convolutional mixers, patches, sparse reconstructions such as autoencoders, and/or bottlenecks. The machine learning model 712 can be a "neural array transform" in that the model 712 transforms the relative correlations/phase-angles of a RF signal incident on an antenna array (e.g., in a specific sub-band) into an estimate about how the RF signal is incident on the antenna array (e.g., its azimuth, elevation, and/or polarization), and/or other estimates.

Based on commutation and simultaneous sampling of two or more RF signals (e.g., from Antennas A and B at time $t_1$ of FIG. 2A, and Antennas A and C at time $t_2$ of FIG. 2A), the machine learning model 114 is exposed to many independent comparative observations (or relative measurements) of an emitted RF signal as received at multiple antennas 102. These independent comparative observations, from multiple combinations of antennas based on commutation, allow the RF model to perform accurate and flexible spatial estimation.

The spatial estimate 120, 714 for the emitter can include, for example, an estimated position coordinate of the emitter (e.g., a two-dimensional or three-dimensional coordinate in space), an azimuth angle of the emitter with respect to the receiving antenna array (e.g., set of antennas 102), a polarization of the received RF signal, an angle of elevation of the emitter with respect to the receiving antenna array, and/or a probabilistic representation of one or more of these parameters, e.g., an estimated probability, for multiple azimuth angles, that the emitter is located at that azimuth angle.

Estimation of an angle between the emitter and the antenna array can be referred to as direction-finding.

As shown in FIGS. 1 and 7, in some implementations, instead of or in addition to the spatial estimates 120, 714, the machine learning model 114, 712 is configured to output a property estimate 122, 716, which can be a non-spatial estimate characterizing the emitter and/or the RF signals received at the antennas 102. For example, the property estimate 122, 716 can include an estimated power level for the emitter (e.g., an estimated power of the RF signals transmitted by the emitter and received at the antenna array), an estimated signal to noise ratio (SINR) for the emitter (e.g., SINR of the RF signals), and/or an estimated "signalness." The signalness is a value indicative of the probability or estimate that an RF signal (e.g., any RF signal, or an RF signal having one or more characteristics) is present in a particular bin, e.g., a frequency bin or a discrete wavelet transform (DWT) bin. Another example of a property estimate 122, 716 is a "combined" signal, e.g., a version of a received RF signal which may have higher signal quality than any version of the RF signal received at individual array elements. Accordingly, in some implementations, the "spatial estimation module" is configured to output property estimates, without necessarily (though optionally also) outputting spatial estimates.

Figure 9:
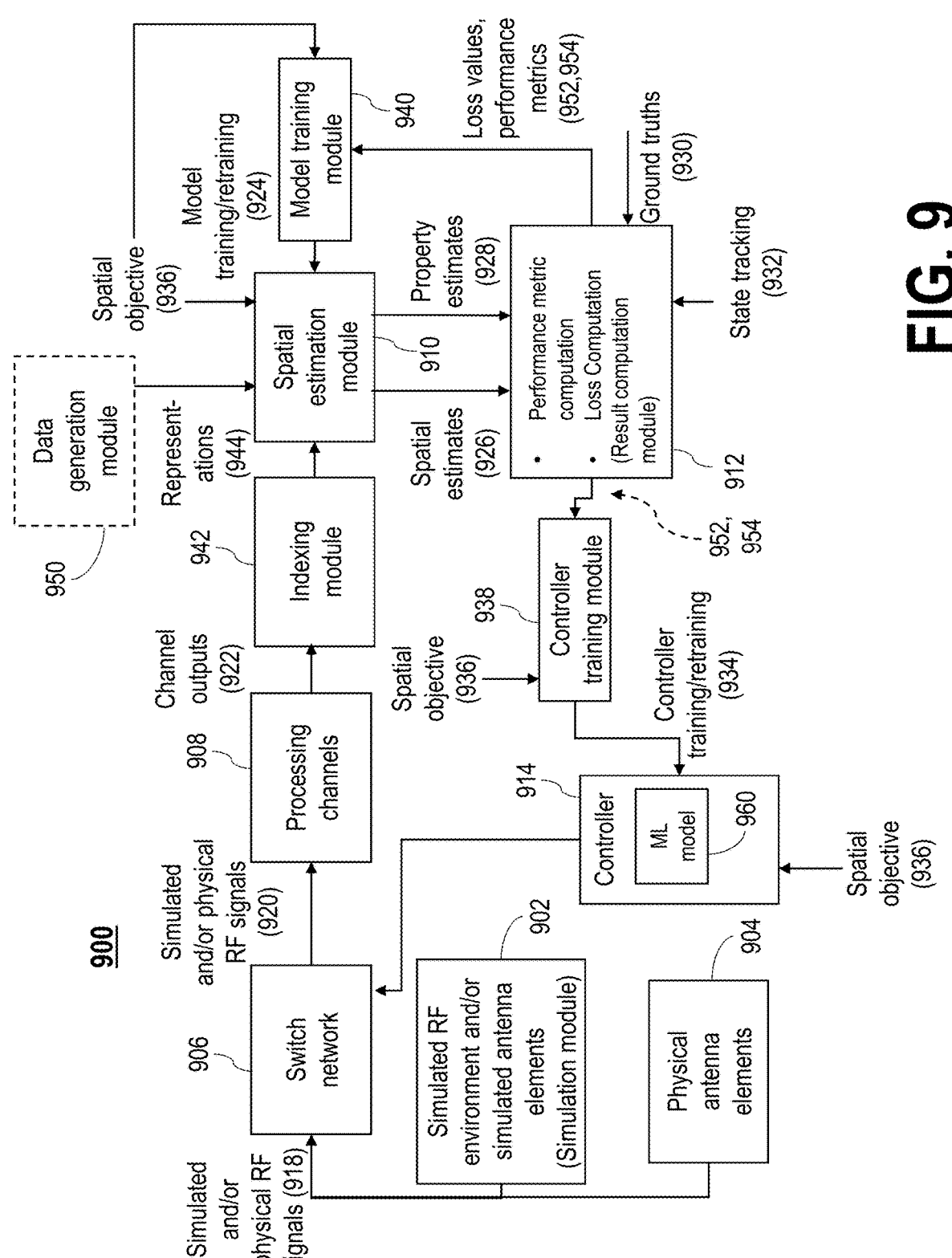
FIG. 9 is a diagram illustrating an example of a system.

FIG. 9 illustrates an example of a system 900 associated with training the machine learning model 114 (or similarly, machine learning model 712). The system 900 includes at least some of: a simulation module 902; physical antenna elements 904; a (real or simulated (e.g., implicit)) switch network 906; processing channels 908; an indexing module 924; a spatial estimation module 910; a loss computation module 912; a controller 914; a model training module 940; a controller training module 938; and/or a data generation module 950.

The system 900 and/or modules thereof can be included in or implemented by one or more computer systems, e.g., one or more computing devices including one or more processors and associated memory/storage storing instructions that cause the one or more processors to perform the disclosed operations. In some implementations, the system 900 is implemented wholly or partially by a cloud computing system. In some implementations, the system 900 is implemented wholly or partially by a back-end computer system of a wireless network (e.g., a radio access network (RAN), such as by a distributed unit (DU), centralized unit (CU), and/or a RAN intelligent controller (RIC) application). In some implementations, the system 900 is implemented wholly or partially by a user device (UE) or by a computer system of a base station, e.g., to perform retraining after deployment. In some implementations, the system 900 and/or modules thereof can be included in or implemented by one or more programs or software modules.

The physical antennas elements 904 can have the characteristics described for sets of antennas (e.g., antenna arrays) throughout this disclose, e.g., as described for the antennas 102, 202, 402, or 502. The processing channels 908, indexing module 942, and spatial estimation module 910 can have the characteristics described for RF signal processing channels, indexing modules, and spatial estimation modules throughout this disclosure, e.g., as described for the processing channels 104, 204, 404, 505, as described for the indexing modules 110, 220, 250, 420, 520, and as described for the spatial estimation modules 112, 700, and vice-versa, except where indicated otherwise. For example, the processing channels 908 can receive physical and/or simulated RF signals 920 and process the signals 920 to obtain channel outputs 922 (e.g., digital IQ samples); the indexing module 942 can process the channel outputs 922 to generate representations 944 (e.g., as described for representations 118, 222, 256, 432, 532; and the spatial estimation module 910 can perform spatial estimation (e.g., as discussed in reference to FIGS. 1 and 7) to obtain spatial estimations 926 and/or property estimates 928. The spatial estimates 926 and property estimates 928 can have characteristics as described for the spatial estimates 120, 714 and property estimate 122, 716 of FIGS. 1 and 7. The use of physical data can be useful in retraining contexts (e.g., "live" training), in which real-world signals processed using a deployed machine learning model can be used to re-train the machine learning model.

In some implementations that include the physical antenna elements 904, physical RF signals 918 are received from the physical antenna elements (e.g., corresponding to an RF signal received wirelessly at the physical antenna elements 904) and are provided through a physical switch network 906 (or other device for performing commutation) at the processing channels 908 in a commutated manner, as controlled by the controller 914.

In some implementations, the physical RF signals 918 are previously-recorded physical RF signals that are subsequently retrieved for use in the system 900, e.g., the physical RF signals 918 need not be received and processed in real-time. Stored RF signals 918 can be stored in association with corresponding emitter locations for use in training as ground-truth values 930. In some implementations, the channel outputs 922 (e.g., digital IQ data) are previously-stored and correspond to physical RF signals.

Alternatively, or in addition, one or more of the RF signals 918 themselves, commutation by the switch network 906, RF signal processing by the processing channels 908, and indexing by the indexing module 942 can be simulated. For example, the simulation module 902 can simulate wireless reception of RF signals at an antenna array, for many different emitter directions and/or positions, channel effects, array configurations, and/or environmental parameters. The simulation module 902 can simulate the signal reception subject to one or more real-world effects, such as channel effects, environmental effects, locations of the receiving antenna array, emitter, and/or environmental objects (e.g., which can affect signal propagation). For example, the simulation module 902 can utilize free space models for antenna propagation, other channel models such as tapped delay line (TDL) or clustered delay line (CDL), and/or may utilize more models such as ray-tracing models, differentiable ray-tracing models, or radio frequency radiance field (RF-RF) models to simulate the propagation of RF signals 918 from one or more emitters onto antenna elements.

The simulated RF signals 920 can be provided to the processing channels 908 by the controller 914 in a commutated manner or in a manner that simulates commutation, e.g., the switch network 906 can be simulated, implicit, or absent in some implementations, with the RF signals 918 directly provided to the processing channels 908 in a time-commutated manner. The processing channels 908 can generate channel outputs 922 as described in reference to FIGS. 1, 2A-2C, and 4-5, and the indexing module 942 can receive the channel outputs 922 and generate the representations 944.

In some implementations, the representations 944 can be generated directly, e.g., direct generation of tensors that are representative of simulated RF signals. The generation of the representations 944 can be performed by the data generation module 950. For example, the tensors or other representations 944 can be generated with zeros, erasures, or other suitable data elements (such as "0000" in representation 222) to simulate commutation of antenna elements. In some implementations, the tensors or other representations 944 can be generated from representations of uniformly-sampled, non-commutated antenna configurations (e.g., tensors representing data from full n-channel receivers for n antenna elements, or tensors representing data from non-commutated simulations) by introducing the zeros, erasures, or other suitable data elements into the representations.

Generation of the representations 944 can be performed based on RF propagation and/or processing simulation. For example, generation of the representations 944 can include simulation of, and/or performance of, channel effects, gain control, scaling, clipping, squaring, averaging, filtering, power control, attenuation, I/Q balancing, and/or other types of processing and/or compensation. In some implementations, data augmentation can be performed to increase an amount of training data available. The introduction of zeros, erasures, or other suitable data elements into representations to generate additional representations 944 is an example of such augmentation. Another example of augmentation is the alteration or permutation of physical and/or simulated data to simulate real-world effects, such as channel effects.

Simulation and processing to obtain the representations 944 need not be performed according to any particular processing sequence (e.g., the sequence of FIG. 9 from the switch network 906, to the processing channels 908, and to the indexing module 942). Rather, a variety of methods and approaches can be used to generate the representations 944. In FIG. 9, all of these methods and approaches are represented by the data generation module 950, which can be a discrete module used for representation generation and/or which can represent part or all of the processing indicated in FIG. 9 by the modules 902, 906, 908, 942 and described herein with respect to FIG. 9. As a result, the representations 944 include physical and/or simulated data representative of commutated RF signal detection/processing for many different emitter directions and/or positions, channel effects, array configurations, and/or environmental parameters.

The spatial estimation module 910 obtains the representations 944 and processes the representations 944 using a machine learning model to obtain spatial estimates 926 and/or property estimates 928, e.g., as described in reference to FIG. 7. For example, the spatial estimation module 910 can perform one or more transforms (e.g., a Fourier transform) and an inter-relationship calculation (e.g., a covariance calculation), and provide the result (or other data derived from the result) as input to the machine learning model. In some implementations, the spatial estimation module 910 is configured to perform post-processing of machine learning model output to obtain the spatial estimates 926 and/or property estimates 928, e.g., re-scaling, or mapping of the spatial estimates 926 to target values such as a known track, path, location, or angle corresponding to the emitter.

The spatial estimates 926 and/or property estimates 928 are provided to a loss computation module 912, which is configured to calculate one or more loss values 952 (using any suitable loss function) based on a difference between the spatial estimates and/or property estimates 928 and ground-truth values 930. For example, the ground-truth values 930 can include a known (physical and/or simulated) location and/or direction of an emitter of RF signals corresponding to the representations 944, and a loss value 952 can be based on a difference between the known location or direction and a location or direction indicated by the spatial estimates 926.

For example, the representations 944 can be training data, and the ground-truth values 930 can be labels for the training data.

The ground-truth values 930 (e.g., spatial information about emitters, such as locations/directions) can be known a priori as parameters of the simulation to obtained simulated RF signals 920 and/or simulated representations 944. When the ground-truth values 930 correspond to physical emitters, the locations/directions of the emitters can be determined using various techniques, such as based on capturing telemetry or global navigation satellite system (GNSS) data, visual measurement, performing another form of localization such as a Multiple Signal Classification (MUSIC) algorithm and/or an Estimating Signal Parameters via Rotational Invariance Technique (ESPRIT) algorithm, or a time-difference-of-arrival/time-of arrival- or frequency-difference-of-arrival/frequency-of-arrival-based localization. Accordingly, ground-truth data can be obtained for use in training a machine learning model 960 (discussed in further detail below) and/or the machine learning model of the spatial estimation module 910.

The loss value 952 can indicate the accuracy or error of spatial estimation using the machine learning model of the spatial estimation module 910. As another example, in reference to property estimation, the ground-truth values 930 can include a known (physical and/or simulated) power level, SINR, signalness, and/or other characteristic of the physical and/or simulated RF signals based on which the property estimates 928 are determined, and a loss value 952 can be based on a difference between the known characteristic and the corresponding value of that characteristic in the property estimates 928. The loss values 952 can indicate, for example, angular error distribution properties, location error distribution properties, estimation accuracy, etc.

In some implementations, the loss computation module 912 is configured to determine one or more performance metrics 954 for (physical and/or simulated) operation of the system 900. For example, the loss computation module 912 can determine one or more key performance indicators (KPIs) such as power consumption, angular resolution, array size, mean angular error, localization distance, and/or combinations thereof. The KPIs can be based, for example, on a configuration of the controller 914 (discussed in further detail below), e.g., in cases in which the commutation pattern changes power consumption. For example, in some implementations, the number and/or combination of RF channels that are utilized/enabled, and/or the number and/or combination of antenna elements that are utilized/enabled, can be varied, resulting in corresponding different estimation quality and power consumption, as discussed below.

The performance metrics 954 and/or loss values 952 can be used to train and/or retrain/update one or more machine learning models. As used herein, "retraining" or "updating" a machine learning model is included in the term "training," except where indicated otherwise. For example, the loss values 952 (which can represent a quality of spatial estimation and/or property estimation by the spatial estimation module 910) can be used by the model training module 940 to train (924) the machine learning model of the spatial estimation module 910, e.g., machine learning model 114, 712. The training can be performed, for example, to reduce the loss values 952, improve the performance metrics 954, and/or a combination thereof, by updating parameters of the machine learning model, e.g., in an iterative process. Training can utilize, for example, a gradient descent process, Adam optimization, and/or another suitable training process to update weights, hyperparameters, coefficients, and/or the like of the machine learning model. As a result, determination of the estimates 926 and/or 928 can be made more accurate, precise, and/or reliable (e.g., accurate over a wider range of emitter locations, RF signal characteristics, etc.).

In some implementations, not only spatial estimation but also commutation can be at least partially learned. For example, the controller 914 (e.g., any of the controllers described with respect to FIGS. 1, 2A-2C, and 4-5) can optionally include a machine learning model 960 that determines one or more aspects of commutation. For example, the machine learning model 960 can determine which antenna(s) are to be sampled at which time interval(s), the dwell (or commutation rate, e.g., the duration of $t_1$ and $t_2$ in FIG. 2A), and/or when (e.g., how often) a reference signal will be introduced into channel inputs for use in asynchronous indexing. In some implementations, the machine learning model 960 can determine which antennas are to be used/enabled for signal reception (e.g., to select a subset of antennas from a set of available antennas) and/or to determine which channels are to receive RF signals (e.g., to select a subset of channels from a set of available channels). For example, a subset of antenna elements can be used in order to provide better resolution and/or signal quality for example, selecting antenna elements that have a high spacing orthogonal to an approximate region/location of the emitter, that are on the side of a vehicle facing the emitter, that have lower obstruction for signal reception from the emitter, and/or that have a spacing that is more suitable for a signal wavelength emitted by the emitter. In some implementations, the selection of channels and/or antenna elements includes a trade-off between improved estimation resolution/quality and corresponding increased power consumption.

The foregoing parameters adjustable by the machine learning model 960 can be collectively referred to as a commutation pattern or selection schedule. The controller training module 938 can train (934) the machine learning model 960 to learn these and/or other commutation parameters based on the loss values 952 and/or performance metrics 954. For example, certain commutation patterns may provide more accurate and/or reliable spatial estimate 926 and/or property estimates 928, and/or certain commutation patterns may result in improved performance metrics 954 (e.g., reduced power consumption). The machine learning model 960 can be trained to reduce the loss values 952 and/or improve the performance metrics 954 as described in reference model training module 940. In some implementations, the machine learning model 960 is a neural scheduler, and weights of the neural scheduler are adjusted in the training process.

The machine learning model 960 can have any of the architectures and characteristics described for the machine learning models 114, 712. In some implementations, the machine learning model 960 includes an action selection network (e.g., a policy network) of a reinforcement learning-style commutation controller, or another other network type that helps to map objectives to commutation patterns.

In some implementations, the controller 914, the spatial estimation module 910, or both, are trained with respect to, and/or deployed with respect to, one or more spatial objectives 936. The spatial objectives 936 can indicate a target task to be performed in the estimation process. For example, the spatial objectives 936 can include spatial estimation for an emitter that is located in a particular region or in a particular direction (e.g., a broad region or a general direction that can be more narrowly determined using spatial estimation); spatial estimation for a certain number of emitters; spatial estimation for an emitter that is transmitting RF signals having a certain power level, modulation type, directivity, emission timing property, and/or other signal characteristic; spatial estimation prioritized for one emitter or set of emitters compared to another emitter or set of emitters; and/or spatial estimation prioritized for one region/direction or set of regions/directions compared to another region/direction or set of regions/directions. In some implementations, the spatial objectives 936 indicate a context of the spatial estimation, such as environmental conditions, which may affect channel characteristics such as RF signal attenuation/reflection.

The learned configuration of the controller 914 and/or the spatial estimation module 910 can depend on the spatial objectives 936. For example, the controller 914 can be configured to receive the spatial objectives 936 as an input and to apply commutation patterns (e.g., timing, associations of antenna with channels, etc.) that are based on the spatial objectives 936. For example, the controller 914 can determine a set of selection values or indices based on the spatial objectives 936. For example, the controller 914 can implicitly learn (based on its training) which antennas, groupings of antennas, dwell, commutation pattern, etc., provide the best spectral resolution or other parameter of merit (or, generally, are "most useful" as determined by the training) for a given emitter type, emitter location, emitter angle, RF signal characteristic, etc. This learning can be represented in parameters (e.g., weights) of the machine learning model 960 and can be used by the controller 914 (and, in some implementations, other controllers described herein, such as controllers 106, 206, 406, and 506) to perform commutation on received RF signals during training and/or operation.

In some implementations, to train the machine learning model 960 to take into account spatial objectives, spatial objectives 936 corresponding to the representations 944 or RF signals 920 are use as training data, e.g., so that the machine learning model 960 is trained to receive spatial objectives 936 as input when deployed.

The set of selection values or indices (e.g., values or indices indicating array elements from which RF signals are to be sampled) can be determined, for example, based on an element selection schedule of the controller 914, and the element selection schedule can include a look-up table, fixed logic, learned sequences (e.g., learned as a portion or all of the machine learning model 960), action sequences learned in reinforcement learning (e.g., as a portion or all of the machine learning model 960), and/or another suitable fixed or learned software subsystem. The selection values or indices (e.g., a sequence of selection values or indices) can then be passed to element selectors, e.g., a switch controller or multiplexer (MUX) controller. For example, the selection values or indices can be provided to a digital-to-analog converter (DAC) of the controller 914, which produces real signals to provide to selectors; the selection values or indices can be provided to pins (e.g., GPIO pins that are connected to selector components) that select elements based on the selectors or MUX elements; or the controller 914 can implement another method in which the selection values or indices are conveyed to the switch network 906 or other selection mechanism that chooses which RF signal elements to combine into digital receiver channels at each sampling interval. For example, a series of selection bits (0 0) (0 1) (1 0) (1 1) can be provided into a selection/MUX device to select which antenna element is sampled.

Accordingly, the spatial objectives 936 can affect the commutation pattern applied by the controller 914, and the commutation pattern can in turn affect spatial estimation by the spatial estimation module 910. For example, different commutation patterns can result in different resolutions of the calculation output 710 (e.g, covariance spectrum). As a result, commutation can be performed in a manner tuned to a current detection scenario, and spatial estimation and/or property estimation can be improved.

Further, in some implementations, the spatial objectives 936 can instead or additionally be used to train the machine learning model of the spatial estimation module 910 (e.g., machine learning model 114). For example, the machine learning model can be trained to determine spatial estimates 926 and/or property estimates in a manner that depends on a spatial objective 936 provided to the spatial estimation module 910. The description provided above for configuring the machine learning model 960 based on spatial objectives 936 can be applied equally to configuring the machine learning model of the spatial estimation module 910 based on spatial objectives 936. As a result, spatial estimation and/or property estimation can be performed in a manner tuned to a current detection scenario, and spatial estimation and/or property estimation can be improved.

The foregoing description of the controller 914 and spatial estimation module 910 applies not only to the controller 914 and spatial estimation module 910 in the context of the system 900 but also, in some implementations, to any of the controllers and spatial estimation modules 910 described with respect to FIGS. 1, 2A-2C, and 4-5, e.g. controllers 106, 206, 406, 506 and spatial estimation modules 112, 700. For example, any of the foregoing controllers and/or spatial estimation modules can be configured to receive, when deployed and being used for commutation/spatial estimation, spatial objectives, and to perform operations based at least partially on the spatial objectives as described above. This is indicated in FIG. 1 by the spatial objectives 130 that can be provided to the controller 106 and/or the spatial estimation module 112 in FIG. 1.

In some implementations, the machine learning model of the spatial estimation module 910 and/or the machine learning model 960 are trained for a specific arrangement (e.g., count and geometry) of antennas, e.g., a particular physical or simulated geometry of the antenna elements 902, 904. The trained models can then be deployed in a platform (e.g., platform 1100) having the same or a similar arrangement of antennas. In some implementations, one or both of the models is trained for use with a variety of antenna arrangements.

In some implementations, the system 100 is configured to perform state tracking (132) based on the property estimate(s) 122, the spatial estimate(s) 120, or both. State tracking can include determining or estimating an underlying property of the emitter, for example, location, power level, antenna properties, velocity, trajectory, origin, path, etc. For example, a time-sequence of directional estimates, as the spatial estimates 120, can lead to a spatial estimate of a trajectory of the emitter.

As discussed above, the machine learning model 114 of the spatial estimation module 112 (or similarly, the machine learning model 712 of the spatial estimation module 700) can have various architectures and be of various types in different implementations. In some implementations, the machine learning model 114 is a neural network, and the neural network can have one or more "heads" in configurations that, for purposes of this disclosure, have been found to enhance spatial estimation and/or property estimation. A head can be a final portion of the neural network, e.g., including one or more output layers of the neural network. FIGS. 10A-10C illustrate several examples of head configurations, any of which, in various implementations, can be used in the machine learning model 114 and other spatial estimation models discussed herein.

As shown in FIG. 10A, an example of a neural network 1000 includes heads 1002, 1004, and 1006. Head 1002 is an azimuth head configured to output, as a spatial estimate, an estimated azimuth of an emitter of detected RF signals; head 1004 is an elevation head configured to output, as a spatial estimate, an estimated elevation of the emitter; and head 1006 is a signalness head configured to output, as a property estimate, a likelihood that an RF signal is present. This configuration can be useful for single-emitter scenarios.

In some implementations, the neural network 1000 is configured to perform single spatial estimate regression to output, using the heads 1002, 1004, 1006, azimuth, elevation, and signalness for a single bin according to which input data (e.g., a covariance spectrum as described in reference to FIG. 7) is provided to the neural network 1000. In some implementations, the neural network 1000 can include multiple sets of the heads 1002, 1004, 1006 corresponding to multiple bins. For example, the neural network 1000 can include a first azimuth head 1002 configured to output an azimuth of an emitter transmitting in a first frequency range (corresponding to a first bin), and a second azimuth head 1002 configured to output an azimuth of an emitter transmitting in a second frequency range (corresponding to a second bin).

The heads 1002, 1004, 1006 can have any suitable structure. For example, in some implementations, the heads 1002, 1004, 1006 include one or more layers of a neural network, for example fully connected or convolutional layers with non-linearity, such as ReLU, GeLU, SMeLU, or PreLu layers, or another suitable layer type.

In some implementations, the neural network 1000 is configured to perform spatial estimation for multiple emitters simultaneously (e.g., based on a common set of representations) provided to the spatial estimation module). This can be useful, for example, in dense urban and multi-emitter environments, such as in cellular systems in which frequencies are re-used spatially over various spacings, as well as in reflective environments where signals may arrive from multiple angles to arrive at certain locations. In these and other scenarios, it may be desirable to perform signal detection and spatial estimation for multiple signals or emissions arriving at the antenna array (e.g., multiple signals or emissions for each bin).

For example, FIG. 10B illustrates an example of a neural network 1020 configured to perform multi-spatial estimate regression. The neural network 1020 includes three azimuth heads 1022a, 1022b, 1022c configured to output azimuth estimates for three respective emitters (e.g., corresponding to a single bin). During training, a Hungarian matching algorithm or other suitable method can be used to define which head 1022a, 1022b, 1022c should regress which estimate, in the case of multiple regressions. It will be understood that in some implementations the neural network 1020 can include further sets of multiple heads for estimating other spatial values and/or properties such as elevation and/or signalness for multiple emitters simultaneously (e.g., for one bin). Further, in some implementations, the neural network 1020 can include further sets of multiple heads (e.g., multiple sets, each set include multiple azimuth heads, multiple elevation heads, and/or multiple signalness heads), each further set corresponding to a further bin.

In some implementations, neural network heads can be specialized for spatial estimation of emissions within specific spatial regions (such as angular ranges). For example, as shown in FIG. 10C, a neural network 1040 includes three sets of heads 1050a, 1050b, 1050c (sets 150). Each set 1050 is configured to perform spatial and/or property estimation for emissions received at the antenna array from a corresponding angular range (e.g., azimuth). For example, set 1050a includes an azimuth head 1042a, an elevation head 1044a, and a signalness head 1046a, which are configured to output estimated azimuth, elevation, and signalness for signals received from an emitter from an angular range 0° to 30°, for a single bin. The sets 1050b, 1050c include similar sets of heads 1042b, 1044b, 1046b and 1042c, 1044c, 1046c configured to output values for RF signals received in angular ranges 30° to 60° and 60° to 90°, respectively, for the bin. In some implementations, the neural network 1040 can include further sets of heads configured to provide outputs for other bins and/or for other emitters, e.g., so that spatial estimation can be performed for multiple emitters in the 0° to 30° range. In this way, each regression head may specialize in fine-grained detection and spatial estimation tasks within that specific sub-region of the array (e.g., on a subset of the full spatial estimation task), providing specialized and distinct functionality that can result in improved estimation accuracy, precision, and/or reliability.

Moreover, configurations such as that shown in FIGS. 10B and/or 10C can, in some implementations, provide regression for multiple emitters or target angles of emitters or reflectors of emitters simultaneously, e.g., to perform spatial and/or property estimation for co-channel and/or interfering emitters generating RF signals that are arriving at the receiving antenna array at overlapping times and frequencies. This could be used, for example, to detect and perform estimation for multiple cell towers/base stations, mobile devices (e.g., cell phones), Wi-Fi devices, and/or other communications systems transmitting simultaneously on the same time-frequency resources.

In some implementations, the heads can be configured for specific spatial regions (such as angular ranges) by being provided, during training, with training data specific to the spatial regions (e.g., to the exclusion of other spatial regions). For example, the representations 944 can be labeled with ground-truth values 930 that indicates the spatial region of the corresponding RF signals, and each head can be trained specifically using data labeled with its spatial region.

It will be understood that the numbers of heads, configuration of each head, and, in the case of FIG. 10C, angular ranges corresponding to each head of FIGS. 10A-10C are examples, and that implementations of machine learning models according to this disclosure can include arbitrary numbers and configurations of heads. In some implementations, the configuration of machine learning models with heads as described herein can provide more accurate, precise, and/or reliable estimation, and/or can permit estimation for multiple emitters sharing spatial regions, frequencies of emission, and/or times of emission.

The foregoing RF systems, such as the RF systems 100, 200, 400, 500, and 900 (and including, in some implementations, a spatial estimation module as described for or similar to spatial estimation module 700), can be included in various platform to provide accurate and flexible spatial estimation with relatively few processing channels.

Figure 11:
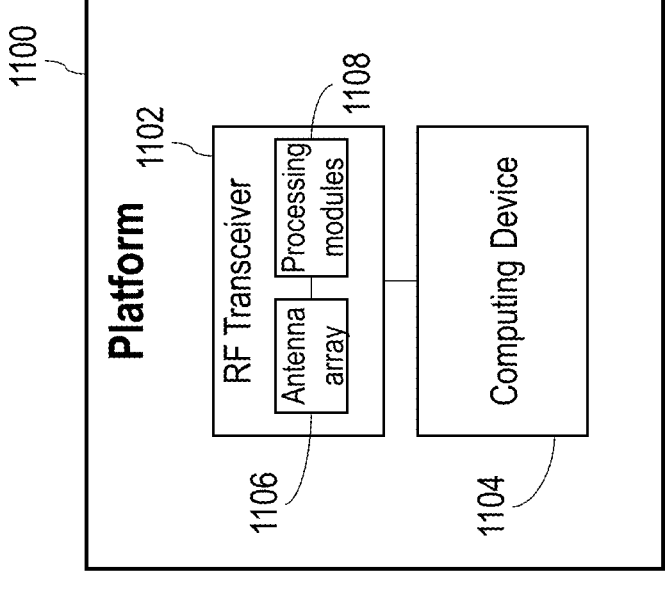
FIG. 11 is a diagram illustrating an example of a platform.

For example, as shown in FIG. 11, a platform 1100 includes an RF transceiver 1102 and a computing device 1104. The RF transceiver 1102 is configured to receive and transmit RF signals. In some implementations, the platform 1100 includes an RF receiver configured to receive RF signals; references herein to an "RF receiver" include the case of a transceiver, because a transceiver performs both receiving and transmitting functions. In some implementations, the platform 1100 includes an RF receiver and a separate RF transmitter that can be used to transmit signals as discussed below.

The transceiver 1102 includes an antenna array 1106 and processing modules 1108. The antenna array 1106 and the processing modules 1108 together can be configured to perform spatial estimation as described for systems 100, 200, 400, 500, and 900. For example, the antenna array 1106 can have characteristics as described for antennas 102, 202, 402, 502, and/or 904, and the processing modules 1108 can include a controller (e.g., controlling a switch network or other commutation device of the processing modules 1108), processing channels, an indexing module, and a spatial estimation module (e.g., including a machine learning model), each of which can have characteristics as described for the corresponding elements of FIGS. 1, 2A-2C, 4-5, 6A-6B, 7-9, and 10A-10C. The computing device 1104 can include one or more processors and one or more storage media (e.g., memory devices) storing instructions that, when executed by the one or more processors, cause the one or more processors to execute various operations. In some implementations, the computing device 1104 includes and/or or implements one or more of the processing modules 1108, e.g., as software modules, programs, and/or applications executing on the one or more processors, such that the one or more processors perform the operations discussed herein.

The processing modules 1108 can output spatial estimates and/or property estimates as described herein and provide the estimates to the computing device 1104 (which, as noted above, can include/implement at least some of the processing modules 1108). The computing device 1104 can perform one or more analysis and/or signal control tasks based on the estimates. For example, based on a spatial estimate indicative of a location of an emitter, the computing device 1104 can use the transceiver 1102 to transmit RF signals to the location. The RF signals can have directivity towards the estimated location (e.g., towards a point in space or towards an estimated angle of the emitter, and, accordingly, in some implementations, RF transmission by the platform 1100 to the emitter can be performed with reduced consumed power, improved efficiency, improved signal-to-noise ratio, improved received power, etc. In some implementations, the computing device 1104 can track the estimated location of the emitter. Other examples of analysis and signal control tasks include signal detection, signal classification, signal reception, demodulation, task scheduling, signal transmission, visualization, summarization, threat detection, drone detection, interference detection, anomaly or change detection, signal property estimation, processing of received bits or packets (e.g. for contents or identifying information), recording of signals, beam combining in a direction, and signaling about an event direction to a network.

The platform 1100 can have many forms in various implementations. For example, because the commutation and machine learning-based processing described herein permit the transceiver 1102 to include relatively few processing channels, the processing modules 1108—which can include two or more processing channels—can be implemented in compact, low-weight, and low-power form, which further may have relatively low cooling needs, while providing high spatial estimation performance (e.g., as opposed to larger many-channel digital receivers that consume more power, are heavier, and/or have a larger form-factor). For example, the processing modules 1108 can include a small radio frequency integrated circuit (RFIC) chip coupled to a number of antennas and/or antenna outputs of the antenna array 1106 that is larger than a number of processing channels included in or used in the processing modules 1108. For example, a two-channel AD9361 RFIC chip can be included in the transceiver 1102 to provide processing channels, and the two-channel chip can receive, in a commutated manner, RF signals from three or more antenna elements providing three or more distinct RF signals. Accordingly, the platform 1100 can be—but is not limited to—a small, mobile platform.

For example, in various implementations, the platform 1100 can include a radio tower or radio facility (e.g., a cellular base station); an aircraft such as a manned or unmanned fixed-wing or drone platform; a spacecraft such as a satellite; a ground vehicle (autonomous or non-autonomous) such as a robot, a robo-dog, a car, a truck, an animal equipped with worn electronics, etc.; an autonomous or crewed water vehicle such as uncrewed surface or underwater vessels (e.g., submarine drones), or a living sea creature, such as a shark or dolphin, equipped with worn electronics; a user equipment (UE) and a computer device such as a phone (e.g., smartphone/cell phone), a laptop, a wearable device such as a human-worn (e.g., augmented reality/virtual reality (AR/VR)) device; a brain-interfacing device; or any other suitable computer or embedded device. Many of these platforms are sensitive in terms of power, weight, cooling, and/or cost. In these cases, permitting the radio (e.g., receiver or transceiver) and compute devices to be small and low-power makes the deployments more feasible.

In some implementations, the platform 1100 can leverage a variety of antenna elements for the antenna array 1106, which may be, for example, inexpensive wires or electrical traces, or carefully-engineered antenna elements. Because, in some implementations, the learned processing of the machine learning model of the spatial estimation module has no specific reliance on array geometry properties such as uniform linear element spacing, array elements of the antenna array can, in some cases, be arranged irregularly. For example, in some cases, the functional design of a platform that does not include commutated sensing for spatial estimation may not need to change to accommodate the commutated sensing—rather, the relevant modules (e.g., antennas, processing channels, switch network, controller, indexing module, and/or spatial estimation module) can be added into the platform interoperably with the platform's existing antennas and/or processing channels.

FIG. 12 illustrates an example of a process 1200 according to some implementations of this disclosure. The process 1200 can be performed, for example, by an RF receiver, for example, by the systems 100, 200, 400, 500, 900, or similar systems as described throughout this disclosure. For example, operations of the process 1200 can be performed by a controller (e.g., controller 106), processing channels (e.g., processing channels 104), an indexing module (e.g., indexing module 110), and a spatial estimation module (e.g., spatial estimation module 112), each of which can be implemented by any suitable analog circuitry, digital circuitry, computing device, software module, and/or computing program, and which need not be distinct modules but which, rather, may be combined or otherwise implemented in various ways, without departing from the scope of this disclosure. The system, RF receiver, or other device or system performing process 1200 can be included in a platform, e.g., platform 1100.

The process 1200 includes providing n RF signals from at least n antennas into m processing channels, where n is an integer greater than two and m is an integer greater than one and less than n (1202). Providing the n RF signals includes causing a first processing channel of the m processing channels to receive, at different corresponding times, a plurality of RF signals of the n RF signals.

For example, operation 1202 can be performed by controlling (e.g., by a controller such as controller 106) a switch network or other commutation means that adjusts a coupling/connection between the n RF signals and the m processing channels. In some implementations, there are n antennas, e.g., as in the case of system 200. In some implementations, there are more than n antennas that have outputs tied together or otherwise combined to produce the n RF signals, e.g., as in the example of FIG. 5. The different corresponding times can be different time intervals, e.g., $t_1$ and $t_2$ of FIG. 2A. The plurality of RF signals can correspond to two or more different antennas, e.g., Antenna B and Antenna C in system 200 or Antennas N/S and Antennas E/W in system 500. The different corresponding times can include a first time interval in which a first RF signal of the plurality of RF signals is received by the first processing channel and a second RF signal of the plurality of RF signals is not received by the first processing channel, and a second time interval in which the second RF signal is received by the first processing channel and the first RF signal is not received by the first processing channel.

The process 1200 further includes generating one or more representations of the n RF signals based on outputs from the m processing channels (1204). For example, the m processing channels (e.g., as described with respect to FIG. 8) can each perform operations such as amplifying, filtering, demodulating, and analog-to-digital conversion, to generate outputs. The outputs can include, for example, digital IQ samples or another suitable data type. The outputs can be processed, for exampled, by an indexing module (such as indexing module 110), which can generate the representations based on an association between the n RF signals and the corresponding times at which the n RF signals are received by the m processing channels. In some cases, (e.g., in implementations in which each of the n RF signals corresponds to a single antenna), the association can be between the n antennas and the corresponding times. The representations can be generated based on an asynchronous indexing scheme or a synchronous indexing scheme, as described with respect to FIGS. 2A-2C and 4-5. In some cases, one representation is generated for each of the n RF signals, or for each of the at least n antennas. The representations can include, for example, time-domain tensors.

The process 1200 further includes executing a machine learning model based on the one or more representations (1206). For example, operation 1206 can be performed by a spatial estimation module such as spatial estimation module 112, which executes a machine learning model (such as machine learning model 114). The representations can optionally be processed in one or more ways, and the result of the processing can be provided as input to the machine learning model. For example, as described with respect to FIG. 7, the representations can be transformed, a covariance spectrum can be computed based on the transformed representations, and the covariance spectrum can be provided as input to the machine learning model. However, the processing is not limited thereto. The machine learning model can have been trained as described with respect to FIG. 9 (e.g., according to process 1300 discussed below). The machine learning can have a structure as described with respect to FIGS. 10A-10C, but the structure is not limited thereto.

The process 1200 further includes determining, based on an output of the machine learning model, a spatial estimate for an emitter of the n RF signals (1208). For example, the spatial estimate can include an angle of the emitter with respect to the at least n antennas (e.g., an azimuth), an elevation of the emitter with respect to the at least n antennas, a location of the emitter, etc. The "emitter of the n RF signals," as used herein, includes an emitter/transmitter of one or more RF signals that are received at the at least n antennas, and the n RF signals are representative of the one or more RF signals emitted/transmitted by the emitter. It will be understood that the n RF signals can be Doppler-shifted, faded, distorted, attenuated, interfered—with, and/or operated on by one or more other channel effects compared to the one or more "as-transmitted" signals from the emitter, without departing from the scope of this disclosure and the meaning of "emitter of the n RF signals." It will further be understood that the n RF signals can correspond to a single "as-transmitted" RF signal, where the n RF signals may differ from one another (and from the as-emitted RF signal) due to different antenna positions, antenna directivity, receive timings, channel effects, etc., and that this scenario is within the scope of this disclosure and the meaning of "emitter of the n RF signals."

FIG. 13 illustrates another example of a process 1300 according to some implementations of the present disclosure. The process 1300 can be performed, for example, by the system 900 or a portion thereof. For example, one or more computing systems and/or computing devices can be configured to perform the process 1300, e.g., using one or more modules as discussed with respect to FIG. 9 (e.g., hardware and/or software modules, including any suitable analog and/or digital circuitry, software, computer program, etc.). In some implementations, the one or more computing systems and/or computing devices configured to perform process 1300 are included in a network component such as a distributed unit (DU), centralized unit (CU), and/or a RAN intelligent controller (RIC) application; however, performance of the process 1300 is not limited to that context.

The process 1300 includes obtaining representations of processing, by m processing channels, of n RF signals received by at least n antennas, where n is an integer greater than two and m is an integer greater than one and less than n (1302). The representations indicate reception, by a first processing channel of the m processing channels, of a plurality of RF signals of the n RF signals at different corresponding times.

For example, the representations can be (physical or simulated) results of time-commutated reception of RF signals at processing channels, e.g., as described with respect to the representations 944. The representations can correspond to real-world, physical signals that were received at antennas and processed by an RF processing chain; augmented versions of physical signals; and/or simulated signals. The processing channels of operation 1302 can include physical circuits including, e.g., amplifier elements, mixers, etc., and/or can be simulated or implicit. For example, in some implementations, digital IQ data (corresponding to an output of processing channels), or the representations, is simulated/generated as if obtained using processing channels, without the use of RF processing chain circuitry.

The representations can indicate the reception, by the first processing channel of the m processing channels, of the plurality of RF signals at the different corresponding times, in various ways. For example, in some implementations, at least one of the representations is sparse (e.g., as shown for representations 2 and 3 of FIG. 2B), and null, zero, missing, or otherwise-encoded elements (e.g., "000") correspond to the results of time-commutation, e.g., time intervals at which a given one of the n RF signals was not being received and processed by the first processing channel, while another of the n RF signals was being received and processed by the first processing channel.

The process 1300 further includes training a machine learning model, using, as training data, the representations, and as labels for the training data, a ground-truth location or direction of an emitter of the n RF signals (1304). The representations can be used as training data directly, or the representations can be processed in one or more ways, and a result of the processing can be used directly as training data, a case which is included in the scope of operation 1304. For example, as described with respect to FIG. 7, the representations can be transformed and processed to obtain a covariance spectrum corresponding to the representations, and the covariance spectrum can be used as training data. Other suitable processing is also within the scope of this disclosure. The ground-truth location or direction can be a physical location or direction (e.g., obtained for the emitter using a GNSS system, an alternative localization method, etc.) or can be obtained based on simulations that provided the n RF signals.

The trained machine learning model can have characteristics as described for, for example, the machine learning models 114 and/or 712, and/or the machine learning model of the spatial estimation module 910. In some implementations, the trained machine learning model has a structure as described with respect to FIGS. 10A-10C, but the structure is not limited thereto.

The process 1300 further includes deploying the trained machine learning model in an RF receiver (1306). For example, the trained machine learning model can be deployed in an RF receiver (e.g., a transceiver) of a platform 1100.

Some implementations of the foregoing processes, systems, and devices can provide more accurate, precise and/or flexible spatial estimation than some alternative methods. For example, some alternative methods may rely on tying together fixed combinations of antenna elements to produce a number of RF signal outputs that matches a number of processing channels. By contrast, some implementations according to this disclosure (e.g., as described in reference to FIGS. 2A-2C and 4-6), have more RF signal outputs, from an antenna array, than processing channels, and employ temporal commutation in combination with machine leaning (e.g., using covariance data) to ensure that each RF signal output is sampled at least some of the time. Compared to the aforementioned alternative methods, implementations according to these disclosure can retain more information from individual antennas, resulting in more accurate, precise, and/or flexible spatial estimation.

Moreover, as discussed above, compared to methods that rely on utilizing an equal number of processing channels and antenna elements (or antenna element signal outputs), the methods and systems described herein can provide reduced cost, spatial footprint, weight, and/or power consumption, by including fewer processing channels than antenna elements or antenna element signal outputs.

Further, the use of machine learning together with commutation, as described herein, can provide a great deal of flexibility and generality in terms of the reception conditions and RF signals that can be received for spatial estimation. For example, some implementations do not rely on specific Doppler shift calculations or assumptions about the structure of the RF signals received at the antenna array. For example, some implementations of the methods and systems described herein can provide accurate spatial estimation using arbitrary or near-arbitrary antenna arrangements, received RF signal shapes and modulation schemes, switching times, and various other parameters of RF signals and their reception.

The disclosed methods and systems can be used within communications systems (e.g., as the platform 1100) such as future massive MIMO, distributed massive MIMO, or extreme massive MIMO systems, where very large numbers of antennas (e.g., 64, 512, 1024, or more antennas) may be utilized for directional transmission and reception of radio signals such as communications signals. In such systems, spatial modes or spatial re-use may be key to the overall spectral efficiency, SINR, and sum-rate of the total system. These systems may be split into analog sub-arrays, which are combined or transmitted using analog RF phase shifters, and digital port-combining, where every port is sampled continuously and combined or separated using a digital combining, beamforming, or other digital signal processing algorithm. The number of digital ports may be kept relatively low to maintain reasonable cost, power, cooling, and size of the device. Accordingly, the systems and methods discussed herein may be used within such large antenna arrays, for instance, by changing the timing, combining, delays, phase values, or other parameters of how the analog components are mapped to the digital ports/channels of the system, by leveraging a similar commutated approach or other combinatorial way of combining analog elements using various time, phase, amplitude, and/or delay offsets in a controlled way. In doing so, effective solutions to the number of digital ports required to attain equivalent performance to the critically sampled very large array may be achieved with a more sparse equivalent, which may reduce the effective power and cost requirement of such a system, while providing better spatial utilization, accuracy, and capacity within wireless systems.

Figure 14:
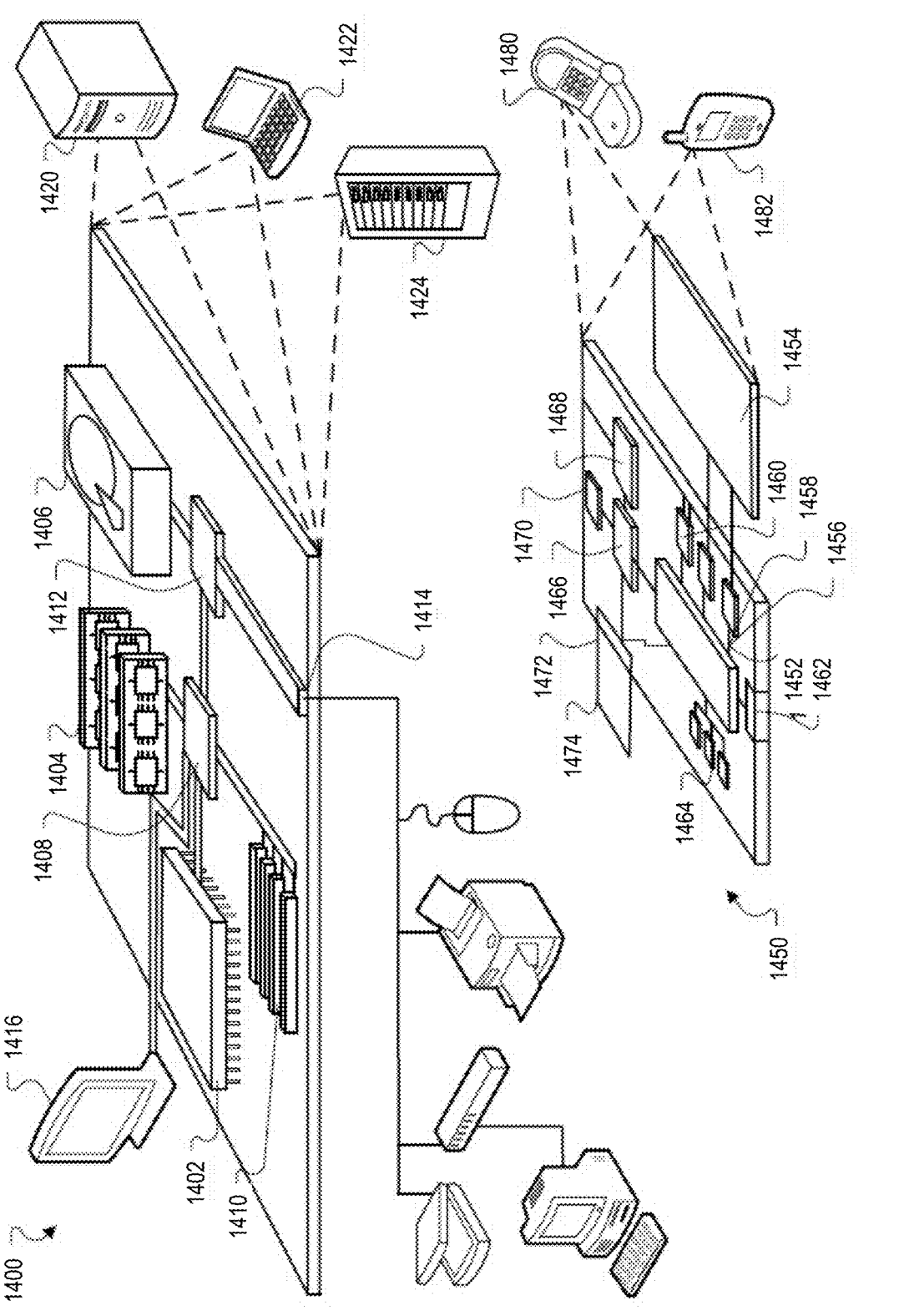
FIG. 14 is a diagram illustrating an example of a computer system.

FIG. 14 is a diagram illustrating an example of a computing system that may be used to implement one or more components of a system that performs commutated spatial estimation. The computer system illustrated in FIG. 14 can be, or can include, a platform 1100 described with respect to FIG. 11. Moreover, The computer system illustrates in FIG. 14 can include and/or can implement the systems/modules 100, 200, 400, 500, 700, 800, 900, and/or components/modules thereof. The computer system illustrated in FIG. 14, and/or a component or portion thereof, can be used to perform any of the processes described herein, such as processes 1200 and/or 1300.

The computing system includes computing device 1400 and a mobile computing device 1450 that can be used to implement the techniques described herein. For example, either or both of the computing device 1400 and the mobile computing device 1450 can process RF signals to perform spatial estimation, can control commutation of RF signals, can perform indexing to generate representations, can perform representation pre-processing, can execute machine learning models for estimation, can train machine learning models for estimation and/or commutation control, etc.

The computing device 1400 is intended to represent various forms of digital computers and network components, such as laptops, desktops, workstations, personal digital assistants, servers, blade servers, cloud computing systems, base stations, mainframes, back-end network equipment, and other appropriate computers. The mobile computing device 1450 is intended to represent various forms of mobile devices, such as personal digital assistants, cellular telephones, smart-phones, mobile embedded radio systems, radio diagnostic computing devices, and other similar computing devices. The components shown here, their connections and relationships, and their functions, are meant to be examples only, and are not meant to be limiting.

The computing device 1400 includes a processor 1402, a memory 1404, a storage device 1406, a high-speed interface 1408 connecting to the memory 1404 and multiple high-speed expansion ports 1410, and a low-speed interface 1412 connecting to a low-speed expansion port 1414 and the storage device 1406. Each of the processor 1402, the memory 1404, the storage device 1406, the high-speed interface 1408, the high-speed expansion ports 1410, and the low-speed interface 1412, are interconnected using various busses, and may be mounted on a common motherboard or in other manners as appropriate. The processor 1402 can process instructions for execution within the computing device 1400, including instructions stored in the memory 1404 or on the storage device 1406 to display graphical information for a GUI on an external input/output device, such as a display 1416 coupled to the high-speed interface 1408. In other implementations, multiple processors and/or multiple buses may be used, as appropriate, along with multiple memories and types of memory. In addition, multiple computing devices may be connected, with each device providing portions of the operations (e.g., as a server bank, a group of blade servers, or a multi-processor system). In some implementations, the processor 1402 is a single-threaded processor. In some implementations, the processor 1402 is a multi-threaded processor. In some implementations, the processor 1402 is a quantum computer.

The memory 1404 stores information within the computing device 1400. In some implementations, the memory 1404 is a volatile memory unit or units. In some implementations, the memory 1404 is a non-volatile memory unit or units. The memory 1404 may also be another form of computer-readable medium, such as a magnetic or optical disk.

The storage device 1406 is capable of providing mass storage for the computing device 1400. In some implementations, the storage device 1406 is or includes a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, processor 1402), perform one or more methods, such as those described above. The instructions can also be stored by one or more storage devices such as computer- or machine-readable mediums (for example, the memory 1404, the storage device 1406, or memory on the processor 1402). The high-speed interface 1408 manages bandwidth-intensive operations for the computing device 1400, while the low-speed interface 1412 manages lower bandwidth-intensive operations. Such allocation of functions is an example only. In some implementations, the high-speed interface 1408 is coupled to the memory 1404, the display 1416 (e.g., through a graphics processor or accelerator), and to the high-speed expansion ports 1410, which may accept various expansion cards (not shown). In the implementation, the low-speed interface 1412 is coupled to the storage device 1406 and the low-speed expansion port 1414. The low-speed expansion port 1414, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1400 may be implemented in a number of different forms, as shown in the figure. For example, it may be implemented as a standard server 1420, or multiple times in a group of such servers. In addition, it may be implemented in a personal computer such as a laptop computer 1422. It may also be implemented as part of a rack server system 1424. Alternatively, components from the computing device 1400 may be combined with other components in a mobile device (not shown), such as a mobile computing device 1450. Each of such devices may include one or more of the computing device 1400 and the mobile computing device 1450, and an entire system may be made up of multiple computing devices communicating with each other.

The mobile computing device 1450 includes a processor 1452, a memory 1464, an input/output device such as a display 1454, a communication interface 1466, and a transceiver 1468, among other components. The mobile computing device 1450 may also be provided with a storage device, such as a micro-drive or other device, to provide additional storage. Each of the processor 1452, the memory 1464, the display 1454, the communication interface 1466, and the transceiver 1468, are interconnected using various buses, and several of the components may be mounted on a common motherboard or in other manners as appropriate.

The processor 1452 can execute instructions within the mobile computing device 1450, including instructions stored in the memory 1464. The processor 1452 may be implemented as a chipset of chips that include separate and multiple analog and digital processors. The processor 1452 may provide, for example, for coordination of the other components of the mobile computing device 1450, such as control of user interfaces, applications run by the mobile computing device 1450, and wireless communication by the mobile computing device 1450.

The processor 1452 may communicate with a user through a control interface 1458 and a display interface 1456 coupled to the display 1454. The display 1454 may be, for example, a TFT (Thin-Film-Transistor Liquid Crystal Display) display or an OLED (Organic Light Emitting Diode) display, or other appropriate display technology. The display interface 1456 may include appropriate circuitry for driving the display 1454 to present graphical and other information to a user. The control interface 1458 may receive commands from a user and convert them for submission to the processor 1452. In addition, an external interface 1462 may provide communication with the processor 1452, so as to enable near area communication of the mobile computing device 1450 with other devices. The external interface 1462 may provide, for example, for wired communication in some implementations, or for wireless communication in other implementations, and multiple interfaces may also be used.

The memory 1464 stores information within the mobile computing device 1450. The memory 1464 can be implemented as one or more of a computer-readable medium or media, a volatile memory unit or units, or a non-volatile memory unit or units. An expansion memory 1474 may also be provided and connected to the mobile computing device 1450 through an expansion interface 1472, which may include, for example, a SIMM (Single In Line Memory Module) card interface. The expansion memory 1474 may provide extra storage space for the mobile computing device 1450, or may also store applications or other information for the mobile computing device 1450. Specifically, the expansion memory 1474 may include instructions to carry out or supplement the processes described above, and may include secure information also. Thus, for example, the expansion memory 1474 may be provide as a security module for the mobile computing device 1450, and may be programmed with instructions that permit secure use of the mobile computing device 1450. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier such that the instructions, when executed by one or more processing devices (for example, processor 1452), perform one or more methods, such as those described above. The instructions can also be stored by one or more storage devices, such as one or more computer- or machine-readable mediums (for example, the memory 1464, the expansion memory 1474, or memory on the processor 1452). In some implementations, the instructions are received in a propagated signal, for example, over the transceiver 1468 or the external interface 1462.

The mobile computing device 1450 may communicate wirelessly through the communication interface 1466 (e.g., with the computing device 1400), which may include digital signal processing circuitry where appropriate. The communication interface 1466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), LTE, 5G/6G cellular, among others. Such communication may occur, for example, through the transceiver 1468 using a radio frequency. In addition, short-range communication may occur, such as using a Bluetooth, Wi-Fi, or other such transceiver (not shown). In addition, a GPS (Global Positioning System) receiver module 1470 may provide additional navigation- and location-related wireless data to the mobile computing device 1450, which may be used as appropriate by applications running on the mobile computing device 1450.

The mobile computing device 1450 may also communicate audibly using an audio codec 1460, which may receive spoken information from a user and convert it to usable digital information. The audio codec 1460 may likewise generate audible sound for a user, such as through a speaker, e.g., in a handset of the mobile computing device 1450. Such sound may include sound from voice telephone calls, may include recorded sound (e.g., voice messages, music files, etc.) and may also include sound generated by applications operating on the mobile computing device 1450.

The mobile computing device 1450 may be implemented in a number of different forms, as shown in the figure. For example, it may be implemented as a cellular telephone 1480. It may also be implemented as part of a smart-phone 1482, personal digital assistant, or other similar mobile device.

The term "system" as used in this disclosure may encompass all apparatus, devices, and machines for processing data, including by way of example a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of non-volatile or volatile memory, media and memory devices, including by way of example semiconductor memory devices, e.g., EPROM, EEPROM, and flash memory devices; magnetic disks, e.g., internal hard disks or removable disks or magnetic tapes; magneto optical disks; and CD-ROM and DVD-ROM disks. The processor and the memory can be supplemented by, or incorporated in, special purpose logic circuitry. Sometimes a server is a general-purpose computer, and sometimes it is a custom-tailored special purpose electronic device, and sometimes it is a combination of these things.

Implementations can include a back end component, e.g., a data server, or a middleware component, e.g., an application server, or a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

A number of implementations have been described. Nevertheless, it will be understood that various modifications may be made.

While this disclosure contains many specific implementation details, these should not be construed as limitations on the scope of any invention or of what may be claimed, but rather as descriptions of features that may be specific to particular implementations of particular inventions. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results.

What is claimed is:

1. A radio-frequency (RF) receiver comprising:
at least n antennas configured to receive at least n RF signals from an emitter, where n is an integer greater than two;
m processing channels configured to receive and process n RF signals from the at least n antennas, where m is an integer greater than one and less than n;
a controller configured to cause a first processing channel of the m processing channels to receive, at different corresponding times, a plurality of RF signals of the n RF signals;
an indexing module configured to:
receive outputs from the m processing channels, and
generate one or more representations of the n RF signals based on the outputs; and
a spatial estimation module configured to:
receive the one or more representations,
execute a machine learning model based on the one or more representations, and
determine, based on an output of the machine learning model, a spatial estimate for the emitter of the at least n RF signals.

2. The RF receiver of claim 1, wherein the one or more representations comprise sparse representations of the plurality of RF signals received at the first processing channel at the different corresponding times.

3. The RF receiver of claim 1, wherein the one or more representations comprise n representations corresponding to the n RF signals, the n representations comprising at least one sparse representation.

4. The RF receiver of claim 3, wherein the m processing channels comprise a second processing channel configured to receive, from among the n RF signals, only another RF signal distinct from the plurality of RF signals, and wherein the one or more representations comprise a non-sparse representation of the other RF signal.

5. The RF receiver of claim 1, wherein the indexing module is configured to receive, from the m processing channels, m corresponding outputs.

6. The RF receiver of claim 1, wherein the spatial estimation module is configured to determine the spatial estimate unambiguously with respect to lines of bearing between the emitter and the at least n antennas and with respect to a line of symmetry between the at least n antennas.

7. The RF receiver of claim 1, wherein the indexing module is configured to generate the one or more representations based on an association between the plurality of RF signals and the different corresponding times at which the plurality of RF signals are received at the first processing channel.

8. The RF receiver of claim 7, wherein the indexing module is configured to obtain the association based on a timing signal that provides a common timing between the indexing module and the controller.

9. The RF receiver of claim 8, wherein the indexing module is configured to commutate the plurality of RF signals in alignment with fixed radio frames based on the timing signal.

10. The RF receiver of claim 7, wherein the outputs from the m processing channels include a fiducial feature, and
   wherein the indexing module is configured to obtain the association based on the fiducial feature.

11. The RF receiver of claim 10, wherein the fiducial feature corresponds to a reference signal received at the m processing channels, and wherein the reference signal comprises a null termination, an open circuit, a ground, or a predetermined code sequence.

12. The RF receiver of claim 10, wherein the fiducial feature indicates a next-received RF signal of the plurality of RF signals.

13. The RF receiver of claim 7, wherein the plurality of RF signals comprise a first RF signal from a first antenna of the at least n antennas, and a second RF signal from a second antenna of the at least n antennas, and
   wherein the indexing module is configured to, based on the association:
   include data obtained from the first processing channel at a first set of times in a first representation of the one or more representations, the first representation corresponding to the first antenna, and
   include data obtained from the first processing channel at a second set of times, distinct from the first set of times, in a second representation of the one or more representations, the second representation corresponding to the second antenna.

14. The RF receiver of claim 1, comprising at least one switch connected between the at least n antennas and the first processing channel, wherein the controller is configured to control the at least one switch to cause the first processing channel to receive, at the different corresponding times, the plurality of RF signals.

15. The RF receiver of claim 1, wherein the spatial estimation module is configured to:
   determine a measure of relationships between multiple of the one or more representations; and
   execute the machine learning model based on the measure of relationships.

16. The RF receiver of claim 15, wherein the spatial estimation module is configured to:
   apply a domain transformation on the representations, to obtain transformed representations; and determine the measure of relationships using the transformed representations.

17. The RF receiver of claim 1, wherein each of at least two processing channels of the m processing channels comprises at least one of a filter, an amplifier, a mixer, or an oscillator.

18. The RF receiver of claim 1, wherein the controller is configured to cause each of the m processing channels to receive, at different corresponding times, at least two RF signals of the n RF signals.

19. The RF receiver of claim 1, wherein the controller is configured to execute a second machine learning model to determine a commutation pattern for causing the first processing channel to receive the plurality of RF signals at the different corresponding times.

20. The RF receiver of claim 1, wherein the controller is configured to:
   receive a spatial objective indicating a target task to be performed in determining the spatial estimate; and
   determine, based on the spatial objective, a commutation pattern for causing the first processing channel to receive the plurality of RF signals at the different corresponding times.

21. The RF receiver of claim 20, wherein the spatial objective indicates a location of the emitter, a characteristic of RF transmission by the emitter, or an environmental condition.

22. The RF receiver of claim 1, wherein the spatial estimate comprises a location of the emitter, an azimuth angle of the emitter, or an elevation of the emitter.

23. The RF receiver of claim 1, wherein the machine learning model comprises a neural network comprising a plurality of heads, and
   wherein each head of the plurality of heads is configured to output a respective estimate of a plurality of estimates, the plurality of estimates including the spatial estimate for the emitter.

24. The RF receiver of claim 23, wherein the plurality of heads comprise at least two heads configured to output estimates for at least one of:
   respective different RF emitters, or
   respective different spatial regions.

25. The RF receiver of claim 23, wherein the plurality of heads comprise:
   a first head configured to output the spatial estimate, and
   a second head configured to output a signalness of a frequency range.

26. A method comprising:
   providing n RF signals from at least n antennas into m processing channels, where n is an integer greater than two and m is an integer greater than one and less than n, and
      wherein providing the n RF signals comprises causing a first processing channel of the m processing channels to receive, at different corresponding times, a plurality of RF signals of the n RF signals;
   generating one or more representations of the n RF signals based on outputs from the m processing channels;
   executing a machine learning model based on the one or more representations; and
   determining, based on an output of the machine learning model, a spatial estimate for an emitter of the n RF signals.

27. The method of claim 26, wherein the one or more representations comprise sparse representations of the plurality of RF signals received at the first processing channel at the different corresponding times.

28. The method of claim 26, comprising generating the one or more representations based on an association between the plurality of RF signals and the different corresponding times at which the plurality of RF signals are received at the first processing channel.

29. The method of claim 28, comprising obtaining the association based on a timing signal or based on a fiducial feature in the outputs from the m processing channels.

30. A method comprising:

obtaining representations of processing, by m processing channels, of n RF signals received by at least n antennas, where n is an integer greater than two and m is an integer greater than one and less than n, wherein the representations indicate reception, by a first processing channel of the m processing channels, of a plurality of RF signals of the n RF signals at different corresponding times;

training a machine learning model, using:

as training data, the representations or a derivative thereof, and as labels for the training data, a ground-truth location or direction of an emitter of the n RF signals; and deploying the trained machine learning model in an RF receiver.

* * * * *